United States Patent
Yamamoto et al.

(10) Patent No.: US 11,601,417 B2
(45) Date of Patent: Mar. 7, 2023

(54) SOFTWARE ACTIVATION SYSTEM, SEWING MACHINE, AND SERVER

(71) Applicant: BROTHER KOGYO KABUSHIKI KAISHA, Nagoya (JP)

(72) Inventors: Satomi Yamamoto, Okazaki (JP); Masahiro Hanabusa, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 444 days.

(21) Appl. No.: 16/810,125

(22) Filed: Mar. 5, 2020

(65) Prior Publication Data
US 2020/0314081 A1 Oct. 1, 2020

(30) Foreign Application Priority Data
Mar. 27, 2019 (JP) .............................. JP2019-060364

(51) Int. Cl.
*H04L 9/40* (2022.01)
*D05B 19/08* (2006.01)
(Continued)

(52) U.S. Cl.
CPC .......... *H04L 63/083* (2013.01); *D05B 19/006* (2013.01); *D05B 19/08* (2013.01);
(Continued)

(58) Field of Classification Search
CPC ........ D05B 19/06; D05B 19/08; D05B 19/10; H04L 63/06; H04L 63/083; H04L 63/0876; G06F 8/61
See application file for complete search history.

(56) References Cited

U.S. PATENT DOCUMENTS 6,460,140 B1* 10/2002 Schoch .................. G06F 21/10
726/28
2005/0021992 A1* 1/2005 Aida ....................... G06F 21/10
726/26
(Continued)

FOREIGN PATENT DOCUMENTS

JP 2008-097577 A 4/2008
JP 2008-272345 A 11/2008
(Continued)

*Primary Examiner* — Nathan E Durham
(74) *Attorney, Agent, or Firm* — Oliff PLC

(57) ABSTRACT

A software activation system includes a sewing machine and at least one server connected via a network. The sewing machine acquires an authentication code corresponding to an activation target software that is at least one of a program and data not activated on the sewing machine, and transmits, to an authentication server included in the at least one server, an authentication request including the acquired authentication code. The server acquires an authentication key on the basis of the authentication request, when the authentication request is received by the first receiver; and transmits the acquired authentication key to the sewing machine. The sewing machine also receives the authentication key from the authentication server, determines whether the received authentication key satisfies a predetermined authentication condition, and activates the activation target software on the sewing machine when it is determined that the authentication key satisfies the predetermined condition.

19 Claims, 15 Drawing Sheets

(51) Int. Cl.
  *G06F 8/61* (2018.01)
  *D05B 19/00* (2006.01)
  *D05B 39/00* (2006.01)
  *D05B 79/00* (2006.01)
  *D05B 19/10* (2006.01)

(52) U.S. Cl.
  CPC ............ *D05B 19/10* (2013.01); *D05B 39/00* (2013.01); *D05B 79/00* (2013.01); *G06F 8/61* (2013.01); *H04L 63/06* (2013.01); *H04L 63/0876* (2013.01); *D05D 2205/085* (2013.01); *D05D 2205/18* (2013.01)

(56) References Cited

U.S. PATENT DOCUMENTS

| | | | |
|---|---|---|---|
| 2005/0055553 A1* | 3/2005 | Thomaidis | G06F 21/445 |
| | | | 713/176 |
| 2008/0065549 A1 | 3/2008 | Hirata | |
| 2010/0139538 A1 | 6/2010 | Tashiro | |

FOREIGN PATENT DOCUMENTS

| | | |
|---|---|---|
| JP | 2010-136822 A | 6/2010 |
| JP | 2013-202181 A | 10/2013 |
| JP | 2016-214511 A | 12/2016 |

\* cited by examiner

SOFTWARE ACTIVATION SYSTEM, SEWING MACHINE, AND SERVER

CROSS-REFERENCE TO RELATED APPLICATION

This application claims priority to Japanese Patent Application No. 2019-060364, filed on Mar. 27, 2019, the content of which is hereby incorporated by reference.

BACKGROUND

The present disclosure relates to a software activation system including a sewing machine and a server connected via a network, a sewing machine, and a server.

In related art, a system is known in which a sewing machine and a server are connected via a network. In this system, for example, an authorized user can read an update program from a CD-ROM via a PC, and can execute the update program on a sewing machine connected to the PC. In this system, when the user inputs a sewing machine number and a unique CD key of the CD-ROM from a keyboard of the PC, the input sewing machine number and CD key are transmitted to a Web server. The Web server generates an authentication key through computation on the basis of the sewing machine number and the CD key, and transmits the authentication key to the PC. The user inputs the authentication key displayed on the PC to a touch panel of the sewing machine. The sewing machine computes the sewing machine number using reverse computation of the input authentication key, and when the computed sewing machine number matches the sewing machine number of the sewing machine itself, the sewing machine activates the update program.

SUMMARY

According to the above-described system, a function to cause new programs and data to be loaded can be activated on the sewing machine used by the authorized user. However, in this type of system, it is necessary to use the CD-ROM for the function activation of the sewing machine, and thus, there are issues in that a CD-ROM reading device is needed when performing the function activation, and a user operation becomes complex.

An object of the present disclosure is to provide a software activation system, a sewing machine, and a server that allow a user to realize function activation of the sewing machine more simply and with less effort.

Exemplary embodiments provide a software activation system includes a sewing machine and at least one server connected via a network. The sewing machine includes a processor and a memory storing computer-readable instructions. When executed by the processor of the sewing machine, the computer-readable instructions cause the processor to acquire an authentication code corresponding to an activation target software that is at least one of a program and data not activated on the sewing machine, and transmit, to an authentication server included in the at least one server, an authentication request including the acquired authentication code. The server includes a first receiver configured to receive the authentication request from the server, a processor, and a memory storing computer-readable instructions. When executed by the processor of the server, the computer-readable instructions cause the processor to acquire an authentication key on the basis of the authentication request, when the authentication request is received by the first receiver, and transmit the acquired authentication key to the sewing machine. The computer-readable instructions stored in the memory of the sewing machine further cause the processor of the sewing machine to receive the authentication key from the authentication server, determine whether the received authentication key satisfies a predetermined authentication condition, and activate the activation target software on the sewing machine when it is determined that the authentication key satisfies the predetermined condition.

Exemplary embodiments provide a sewing machine that is capable of being connected to at least one server via a network. The sewing machine includes a processor and a memory storing computer-readable instructions. When executed by the processor, the computer-readable instructions cause the processor to acquire an authentication code corresponding to an activation target software that is at least one of a program and data not activated on the sewing machine, transmit, to an authentication server included in the at least one server, an authentication request including the acquired authentication code, receive an authentication key from the authentication server, determine whether the received authentication key satisfies a predetermined authentication condition, and activate the activation target software on the sewing machine when it is determined that the authentication key satisfies the predetermined authentication condition.

Exemplary embodiments provide a server that is capable of being connected to a sewing machine via a network. The server includes a receiver that is configured to receive an authentication request. The authentication request includes an authentication code corresponding to not yet installed software that is at least one of a program and data not yet installed in the sewing machine, and a current status by which software installed in the sewing machine is identifiable. The server also includes a storage device that is configured to store a most recent status by which software to be installed in the sewing machine is identifiable. The server also includes a processor and a memory storing computer-readable instructions. When executed by the processor, the computer-readable instructions cause the processor to acquire an authentication key on the basis of the authentication request, when the authentication request is received by the receiver, transmit the acquired authentication key to the sewing machine, when the authentication request is received by the receiver, on the basis of the current status included in the authentication request, and the most recent status stored in the storage device, identify the not yet installed software to be installed in the sewing machine and acquiring identification information specifying the identified not yet installed software, transmit, to the sewing machine, a confirmation response including the acquired identification information.

BRIEF DESCRIPTION OF THE DRAWINGS

Embodiments of the disclosure will be described below in detail with reference to the accompanying drawings in which.

DETAILED DESCRIPTION OF EMBODIMENTS

Overview of Software Activation System 100

Figure 1:
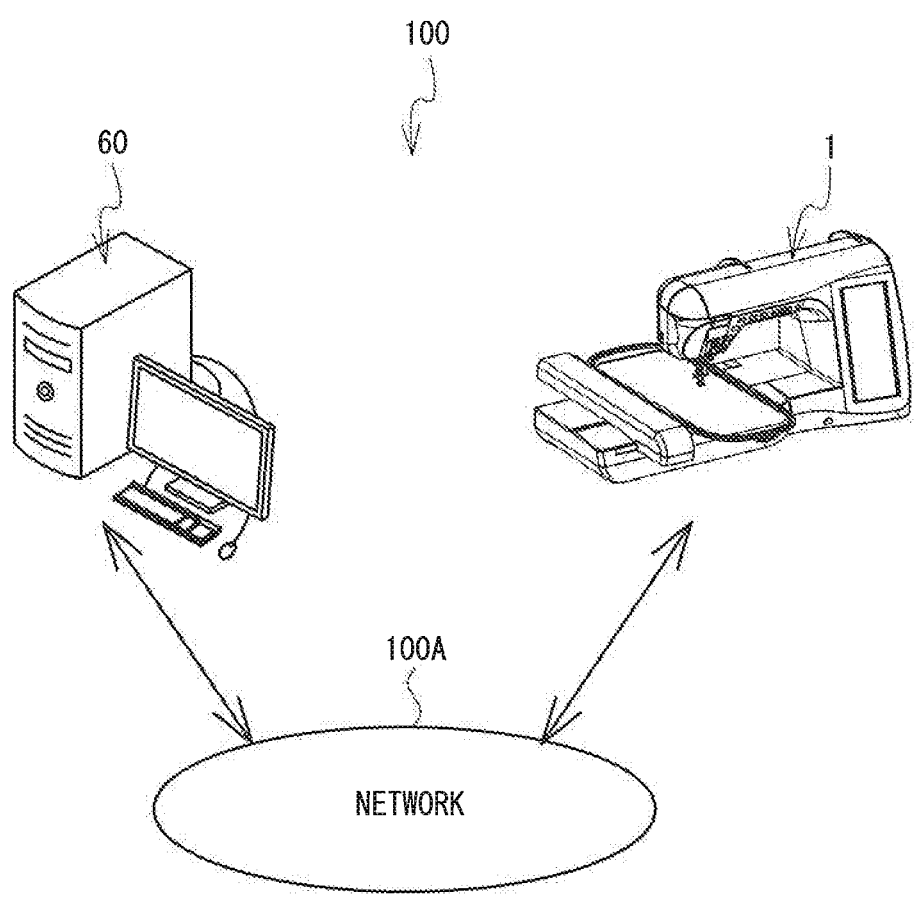
FIG. 1 is a diagram showing an overall configuration of a software activation system 100.

A first embodiment of the present disclosure will be explained with reference to the drawings. Note that the drawings are used to explain technical characteristics that can be obtained by the present disclosure, and are not intended to limit the content of the present disclosure. An overview of a software activation system 100 will be explained with reference to FIG. 1. As shown in FIG. 1, the software activation system 100 includes at least one sewing machine 1, and at least one server 60, which are connected via a network 100A, such as a LAN, a WAN, or the like.

The software activation system 100 activates, on the authorized sewing machine 1, various functions to be loaded on the basis of software. In the present embodiment, at least one of a program and data is defined as the software. Non-activated software in a state of not being able to be used or executed on the sewing machine 1 is defined as not yet installed software. A process of causing software to be stored in the sewing machine 1, and further causing the software to be in a state of being able to be used or executed by the sewing machine 1, is defined as function activation.

Overview of Sewing Machine 1

A physical configuration of the sewing machine 1 will be explained with reference to FIG. 2 to FIG. 4. The up-down direction, the lower right side, the upper left side, the lower left side, and the upper right side in FIG. 2 respectively correspond to the up-down direction, the front side, the rear side, the left side, and the right side of the sewing machine 1. A lengthwise direction of a bed portion 11 and an arm portion 13 correspond to the left-right direction of the sewing machine 1. A side on which a pillar 12 is disposed corresponds to the right side of the sewing machine 1. An extending direction of the pillar 12 corresponds to the up-down direction of the sewing machine 1.

Figure 2:
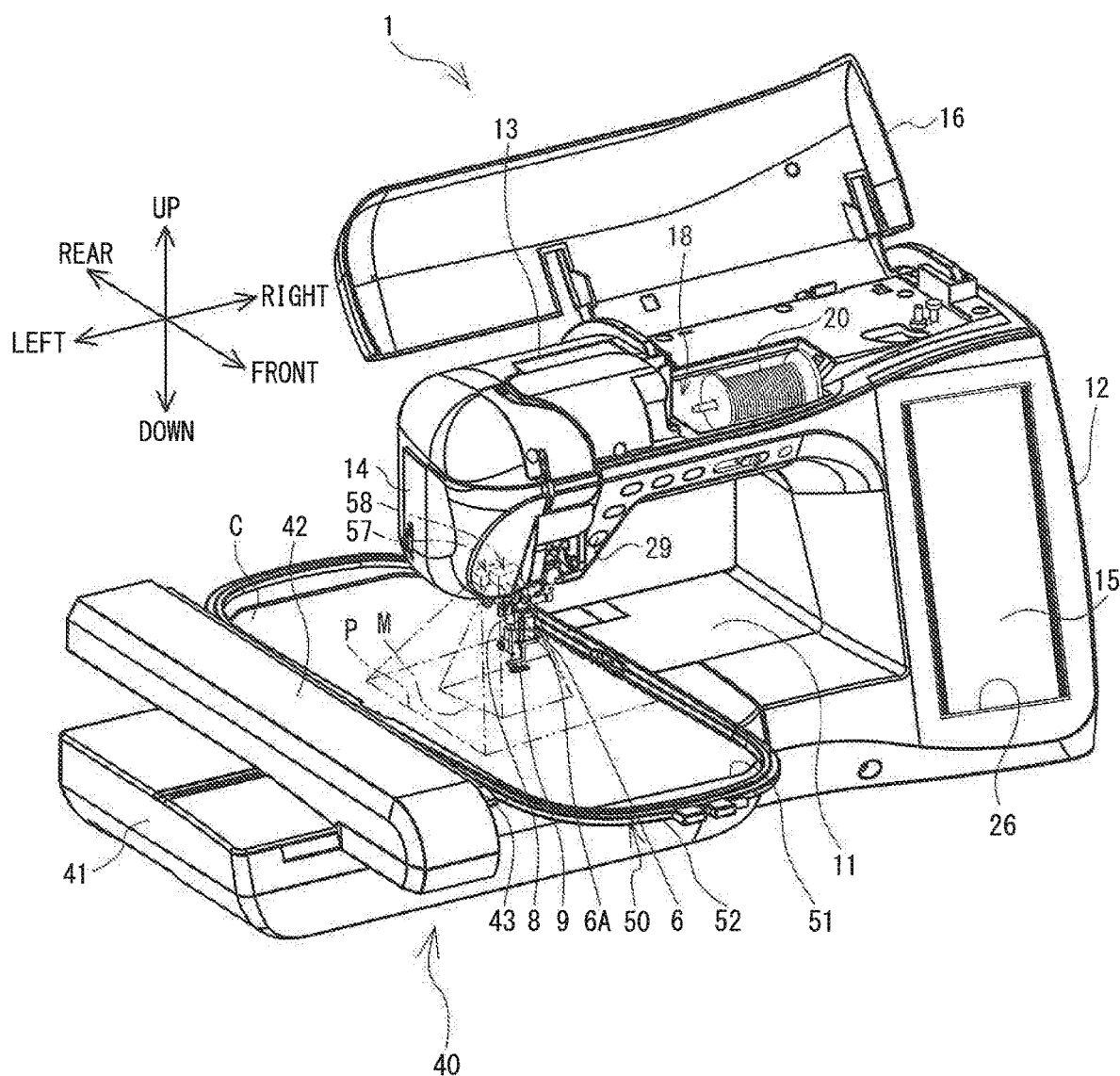
FIG. 2 is a perspective view of a sewing machine 1.

As shown in FIG. 2, the sewing machine 1 is provided with the bed portion 11, the pillar 12, and the arm portion 13. The bed portion 11 extends in the left-right direction. The bed portion 11 is a base portion of the sewing machine 1. The pillar 12 is provided standing upward from the right end portion of the bed portion 11. The arm portion 13 is a portion that extends to the left from the upper end of the pillar 12, and is disposed above the bed portion 11. A camera 57 and a projector 58 to be described later are provided in the lower surface of the arm portion 13. A head portion 14 is provided on the left leading end portion of the arm portion 13.

Figure 3:
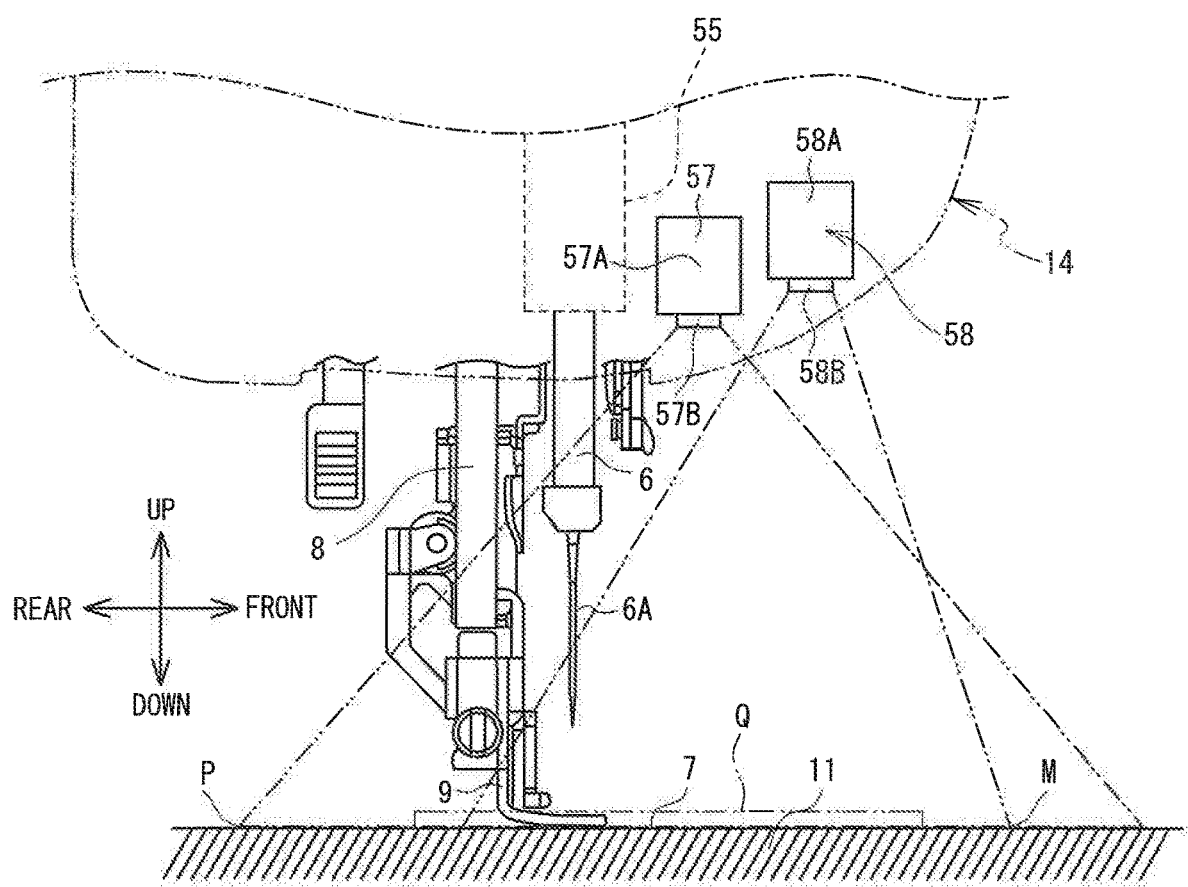
FIG. 3 is an explanatory diagram showing a configuration of a lower end portion of a head portion 14.
Figure 4:
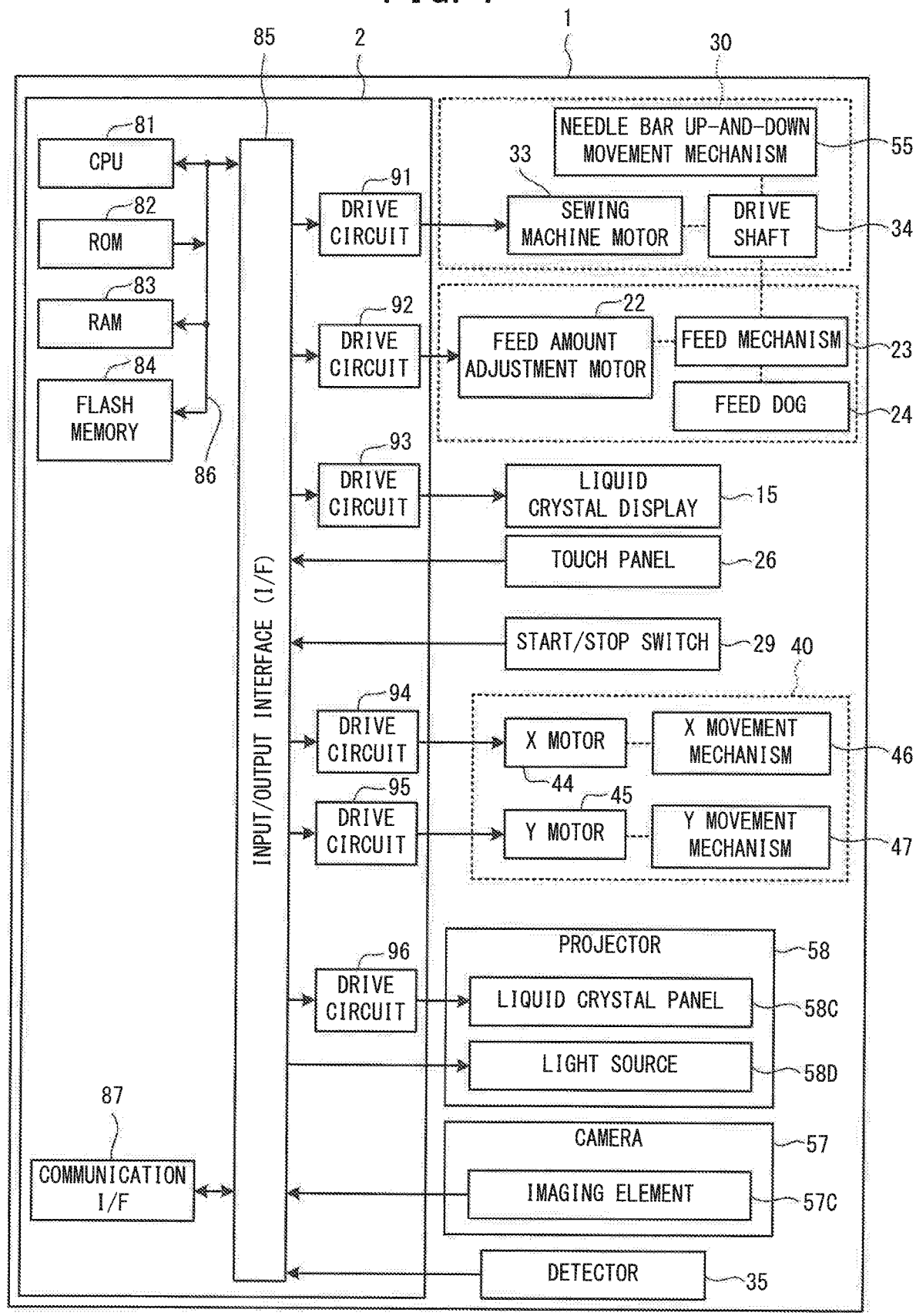
FIG. 4 is a block diagram showing an electrical configuration of the sewing machine 1.

As shown in FIG. 3, a needle plate 7 is provided on the upper surface of the bed portion 11. The needle plate 7 includes a needle hole (not shown in the drawings) through which a sewing needle 6A can be inserted. A position of the needle hole (not shown in the drawings) corresponds to a needle drop position of the sewing needle 6A. A feed dog 24 (refer to FIG. 4), a feed mechanism 23 (refer to FIG. 4), a shuttle mechanism (not shown in the drawings) and the like are provided inside the bed portion 11. During normal sewing, which is not embroidery sewing, the fed dog 24 is driven by the feed mechanism 23, and moves a sewing object by a predetermined movement amount. The shuttle mechanism causes an upper thread (not shown in the drawings) to be entwined with a lower thread (not shown in the drawings), below the needle plate 7.

As shown in FIG. 2, a display 15 is provided in the front surface of the pillar 12. The display 15 displays an image including various items, such as commands, illustrations, setting values, messages, and the like. A touch panel 26 that can detect a pressed position is provided on the front surface side of the display 15. When a user performs a pressing operation on the touch panel 26, the touch panel 26 detects the pressed position. A control portion 2 (refer to FIG. 4) of the sewing machine 1 recognizes a selected items on the image, on the basis of the detected pressed position. Hereinafter, the pressing operation on the touch panel 26 by the user is referred to as a panel operation. By the panel operation by the user, an embroidery pattern that is wished to be sewn, a command to be executed and the like can be selected. A sewing machine motor 33 (refer to FIG. 4) and the like is provided inside the pillar 12.

A cover 16 that can be opened and closed is provided on the upper portion of the arm portion 13. FIG. 2 shows the sewing machine 1 in a state in which the cover 16 is open. A thread storage portion 18 is provided below the closed cover 16 (that is, inside the arm portion 13). The thread storage portion 18 can house a thread spool 20 on which the upper thread is wound. A drive shaft 34 (refer to FIG. 4), which extends in the left-right direction, is provided inside the arm portion 13. The drive shaft 34 is rotationally driven by the sewing machine motor 33 (refer to FIG. 4). Various switches, including a start/stop switch 29, are provided on the lower left portion of the front surface of the arm portion 13. The start/stop switch 29 is used to input a sewing start command or a sewing stop command.

As shown in FIG. 3, a presser bar 8, the camera 57, the projector 58, a sewing portion 30 (refer to FIG. 4), and the like are provided on the head portion 14. The sewing portion 30 includes a needle bar 6, and is configured to form stitches in a sewing object C (refer to FIG. 2) by causing the needle bar 6 to move up and down. The needle bar 6 is positioned above the needle hole (not shown in the drawings) in the needle plate 7. The sewing needle 6A is detachably mounted on the lower end of the needle bar 6. The sewing portion 30 includes the drive shaft 34 (refer to FIG. 4) and a needle bar up-and-down movement mechanism 55 (refer to FIG. 4). The needle bar up-and-down movement mechanism 55 drives the needle bar 6 in the up-down direction as a result of the rotation of the drive shaft 34. A presser foot 9 is detachably mounted on the lower end portion of the presser bar 8. The presser foot 9 moves up and down in accordance with the movement of the presser bar 8, and intermittently presses the sewing object C downward.

The projector 58 can project an image toward the bed portion 11. The projector 58 of the present embodiment is a so-called liquid crystal projector. The projector 58 includes a cuboid housing 58A that is fixed to a machine casing inside the head portion 14. A lens 58B is provided in the lower surface of the housing 58A. A liquid crystal panel 58C and a light source 58D (refer to FIG. 4) are housed inside the housing 58A. The liquid crystal panel 58C forms image light of an image, by modulating light from the light source 58D. The formed image light is emitted downward via the lens 58B. The emitted image light is condensed on the upper surface of the bed portion 11 by the lens 58B. For example, when the sewing object C held by an embroidery frame 50 to be described later is placed on the bed portion 11, the image light is condensed on the sewing object C. Of the upper surface of the bed portion 11, a maximum region over which the image can be projected by the projector 58 is referred to as a projectable region M.

The camera 57 can capture an image of a predetermined image capture range P that includes the projectable region M. The camera 57 includes a cuboid housing 57A. The housing 57A is fixed to the machine casing inside the head portion 14. A lens 57B is provided in the lower surface of the housing 57A. An imaging element 57C (refer to FIG. 4) is housed inside the housing 57A. The image of the image capture range P is captured as a result of light incident from the image capture range P via the lens 57B being detected by the imaging element 57C. For example, in a state in which the image from the projector 58 is projected onto the sewing object C held by the embroidery frame 50, the projected image is captured by the camera 57.

As shown in FIG. 2, an embroidery apparatus 40 can be removably mounted on the bed portion 11 of the sewing machine 1. The embroidery apparatus 40 is provided with a holder 43 on which the embroidery frame 50 that holds the sewing object C can be removably mounted. By moving the holder 43 with respect to the needle bar 6, the embroidery apparatus 40 can convey the embroidery frame 50 mounted on the holder 43. One embroidery frame selected from among a plurality of embroidery frames including the embroidery frame 50 can be mounted on the embroidery apparatus 40. The embroidery frame 50 can hold the sewing object C (a work cloth, for example) between a first frame 51 and a second frame 52.

The embroidery apparatus 40 is provided with a main body portion 41 and a carriage 42. The carriage 42 is provided with the holder 43, a Y movement mechanism 47 (refer to FIG. 4), and a Y motor 45 (refer to FIG. 4). The holder 43 is provided on the right side surface of the carriage 42. The embroidery frame 50 is detachably mounted on the holder 43 of the carriage 42. The Y movement mechanism 47 moves the holder 43 in the front-rear direction (a Y axis direction). The Y motor 45 (refer to FIG. 4) drives the Y movement mechanism 47. The main body portion 41 is internally provided with an X movement mechanism 46 (refer to FIG. 4), and an X motor 44 (refer to FIG. 4). The X movement mechanism 46 moves the carriage 42 in the left-right direction (an X axis direction). The X motor 44 drives the X movement mechanism 46.

Thus, during embroidery sewing using the embroidery frame 50, the embroidery apparatus 40 can move the embroidery frame 50 mounted on the holder 43 in both the X and Y directions. Specifically, the embroidery apparatus 40 is a movement mechanism that can convey the embroidery frame 50 in the directions orthogonal to the up-down direction, above the bed portion 11 and below the arm portion 13. When the sewing machine 1 executes the embroidery sewing using the embroidery frame 50, the needle bar up-and-down movement mechanism 55 and the shuttle mechanism (not shown in the drawings) are driven in concert with processing in which the embroidery frame 50 is moved in the X axis direction and the Y axis direction by the embroidery apparatus 40. In this way, the embroidery pattern is sewn on the sewing object C held by the embroidery frame 50, by the sewing needle 6A mounted on the needle bar 6.

An electrical configuration of the sewing machine 1 will be explained with reference to FIG. 4. The sewing machine 1 is provided with a CPU 81, a ROM 82, a RAM 83, a flash memory 84, and an input/output interface (I/F) 85. The CPU 81 is connected to the ROM 82, the RAM 83, the flash memory 84, and the input/output I/F 85 via a bus 86.

The CPU 81 performs main control of the sewing machine 1. The CPU 81 performs various arithmetic computation and processing in accordance with various programs stored in the ROM 82 or the flash memory 84. Various parameters, the programs, distinguishing information uniquely allocated to the sewing machine 1 (a serial number for example), and the like are stored in the ROM 82. Computation results by the CPU 81 are temporarily stored in the RAM 83. The flash memory 84 stores various programs relating to various functions of the sewing machine 1, various parameters used by the sewing machine 1 to perform various processing, sewing data, and the like. The various programs include firmware that controls the sewing machine 1, and an activation program used to perform processing shown in FIG. 6. The sewing data is data used to sew the embroidery pattern that can be sewn by the sewing machine 1.

Drive circuits 91 to 96, the touch panel 26, the start/stop switch 29, the imaging element 57C of the camera 57, the light source 58D of the projector 58, a detector 35, and a communication I/F 87 are connected to the input/output I/F 85. The detector 35 detects whether the embroidery frame 50 is mounted on the embroidery apparatus 40, and outputs a detection result according to a type of the embroidery frame 50. The detector 35 detects the type of the embroidery frame mounted on the embroidery apparatus 40 depending on a combination of ON and OFF of a plurality of mechanical switches. The light source 58D of the projector 58 is illuminated in accordance with a control signal from the CPU 81. The imaging element 57C of the camera 57 outputs, to the CPU 81, a signal representing an image (hereinafter referred to as a "captured image") of the image capture range P captured in accordance with the detection of light.

The communication I/F 87 is an interface used to perform wireless communication that conforms with a communication standard. Examples of the communication standard include wireless LAN, such as Wi-Fi (registered trademark) or Bluetooth (registered trademark), or the like, or 3G, long term evolution (LTE), 4G or the like. Using the communication I/F 87, the sewing machine 1 can connect to the network 100A via an access point (not shown in the drawings).

The drive circuit 91 drives the sewing machine motor 33 in accordance with a control signal from the CPU 81. As a result of the driving of the sewing machine motor 33, the needle bar up-and-down movement mechanism 55 is driven via the drive shaft 34 of the sewing machine 1. The drive circuit 92 drives a feed amount adjustment motor 22 in accordance with a control signal from the CPU 81. As a result of the driving of the feed amount adjustment motor 22, the feed dog 24 is driven via the feed mechanism 23 of the sewing machine 1. The drive circuit 93 causes an image to be displayed on the display 15 in accordance with a control signal from the CPU 81. The drive circuits 94 and 95 respectively drive the X motor 44 and the Y motor 45 in accordance with control signals from the CPU 81. As a result of the driving of the X motor 44 and the Y motor 45, the embroidery frame 50 mounted on the embroidery apparatus 40 is moved in the left-right direction (the X axis direction) and the front-rear direction (the Y axis direction) by a movement amount corresponding to the control signals. The drive circuit 96 causes an image to be displayed on the liquid crystal panel 58C of the projector 58 in accordance with a control signal from the CPU 81.

Overview of Server 60

Figure 5:
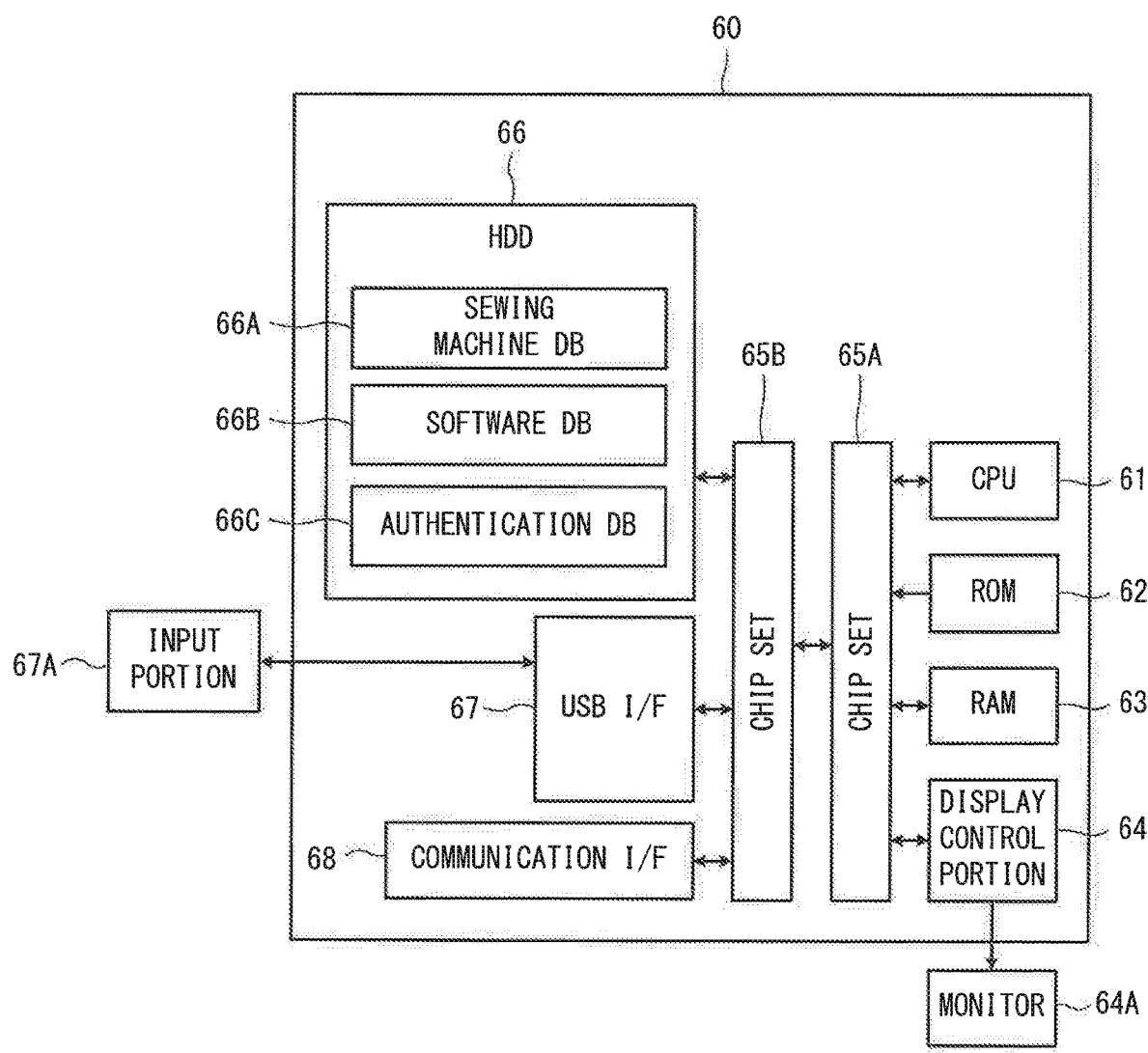
FIG. 5 is a block diagram showing an electrical configuration of a server 60.

An electrical configuration of the server 60 will be explained with reference to FIG. 5. The server 60 is provided with a CPU 61 that performs control of the server 60. The CPU 61 is connected to a chip set 65A, and is electrically connected to a ROM 62, a RAM 63, and a display control portion 64 via the chip set 65A. The chip set 65A is a series of circuit groups that manage the reception and transmission of data between the CPU 61, the ROM 62, the RAM 63, and the display control portion 64. The ROM 62 stores a boot program, a BIOS, and the like. The RAM 63 stores various temporary data. The display control portion 64 controls display of an image on a monitor 64A.

The chip set 65A is connected to a chip set 65B. The CPU 61 is electrically connected to a hard disk drive (HDD) 66, a USB interface (I/F) 67, and a communication I/F 68, via the chip set 65B. The chip set 65B is a series of circuit groups that manage the reception and transmission of data between the CPU 61, the HDD 66, the USB I/F 67, and the communication I/F 68. The HDD 66 stores an OS, various programs including a server program of the software activation system 100, and various data. The HDD 66 stores a sewing machine database (sewing machine DB) 66A, a software database (software DB) 66B, and an authentication database (authentication DB) 66C to be described later. The USB I/F 67 is electrically connected to an input portion 67A that is used to perform an input operation on the server 60, and performs communication on the basis of a USB standard. The communication I/F 68 is connected by wired or wireless connection to the network 100A, and performs data communication.

Main Processing of Sewing Machine 1: Part 1

Figure 6:
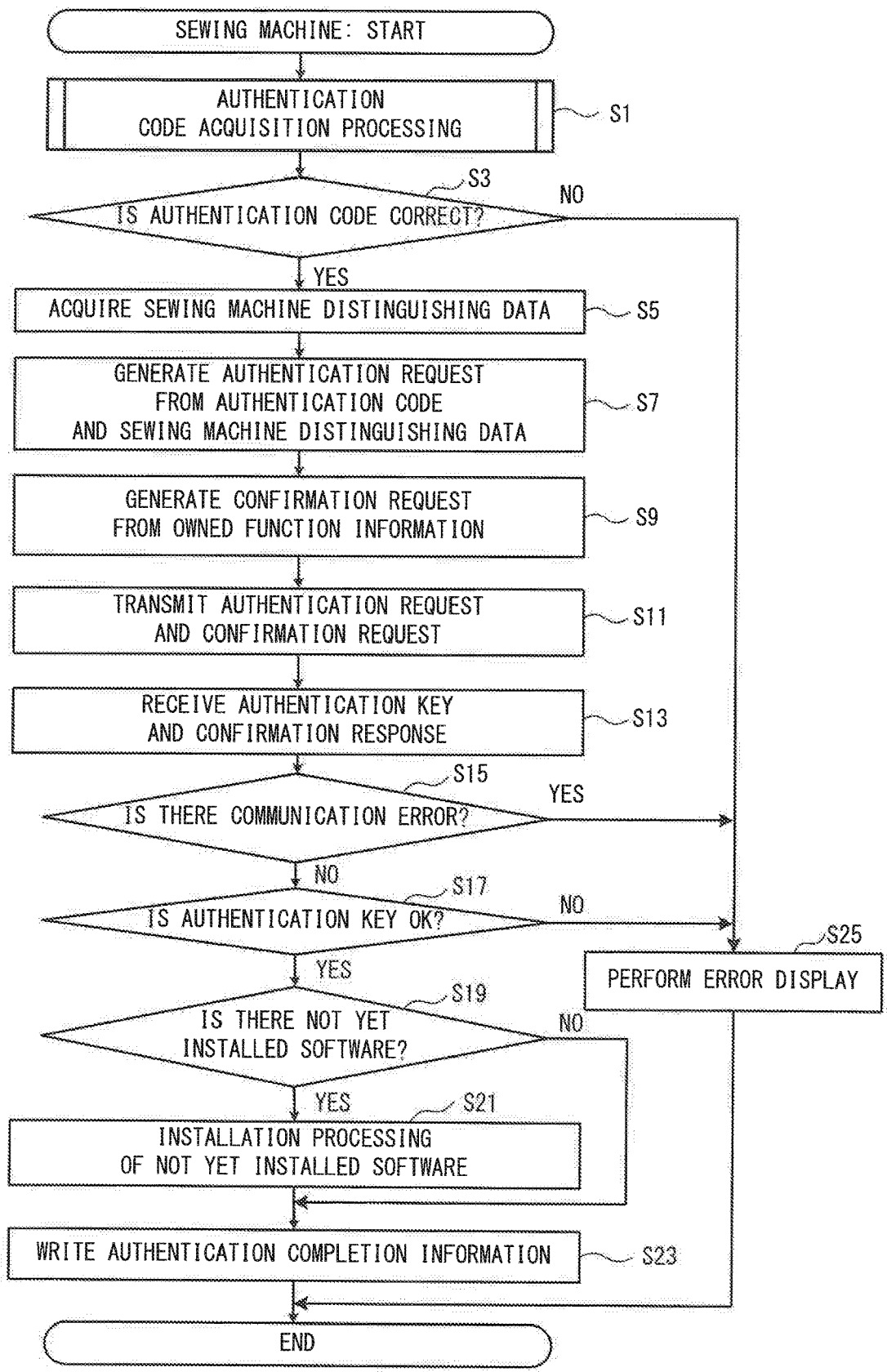
FIG. 6 is a flowchart of main processing of the sewing machine 1 according to a first embodiment.

Of various processing including a sewing operation of the sewing machine 1, main processing relating to the function activation of the sewing machine 1 will be explained with reference to FIG. 6. When the CPU 81 receives a command to execute the function activation while a power source of the sewing machine 1 is in an ON state, the main processing shown in FIG. 6 is performed on the basis of the activation program of the flash memory 84. For example, when an operation mode of the sewing machine 1 is set to an upgrade mode by a panel operation, the CPU 81 determines that the command to execute the function activation has been received. The upgrade mode is the operation mode for upgrading (newly installing or updating, for example) the software of the sewing machine 1.

For example, a manufacturer of the sewing machine 1 provides a latest version of the software, or a latest version of part of the software (a pattern file, for example) to the user as needed. In the upgrade mode described above, it is possible to update to the latest version of the software (a so-called version upgrade), or update to the latest version of the part of the software (a so-called update). Note that, in the upgrade mode, only specific software specified by the user or the manufacturer may be newly installed or updated, or the latest or specific sewing data provided by the manufacturer of the sewing machine 1 may be newly installed.

As shown in FIG. 6, first, the CPU 81 performs authentication code acquisition processing (step S1). The authentication code is a code corresponding to the software to be activated, and is configured, for example, by a character row, a barcode, a two-dimensional barcode and the like. The software to be activated is at least one of a non-activated program or data in the sewing machine 1, and is hereinafter referred to as an activation target. For example, the user obtains, in advance, a printed object Q (refer to FIG. 3) on which the authentication code, which is issued by the manufacturer of the sewing machine 1 and corresponds to the activation target, is printed. The printed object Q of the present embodiment is a license card on which the authentication code is printed in order to update the firmware of the sewing machine 1 to the latest version. In the authentication code acquisition processing to be described later, the authentication code printed on the printed object Q is acquired by being captured by the camera 57.

Note that, as a trigger to start step S1, the sewing machine 1 is in a state in which the authentication code can be acquired. However, when the sewing operation of the sewing machine 1 is performed during acquisition of the authentication code, the camera 57 is influenced by vibrations resulting from the sewing operation, and there is a risk that the authentication code cannot be accurately captured. Thus, in the present embodiment, the CPU 81 performs control such that, from when the state is obtained in which the authentication code can be acquired (that is, from when step S1 is started), the up and down movement of the needle bar 6 by the needle bar up-and-down movement mechanism 55 cannot be performed. Specifically, at least during the authentication code acquisition processing (step S1), the sewing operation of the sewing machine 1 is prohibited.

The CPU 81 determines whether the acquired authentication code is correct (step S3). When the acquired authentication code does not match a data format of an authorized authentication code, the CPU 81 determines that the authentication code is not correct (no at step S3). In this case, the CPU 81 outputs a predetermined error display to the display 15 (step S25). On the other hand, when the acquired authentication code matches the data format of the authorized authentication code, the CPU 81 determines that the authentication code is correct (yes at step S3). In this case, the CPU 81 acquires sewing machine distinguishing data on the basis of the distinguishing information stored in the ROM 82 (step S5). The sewing machine distinguishing data is individual identification data that is unique to the sewing machine 1. In the present embodiment, the CPU 81 calculates, as the sewing machine distinguishing data, a hash value of a serial number stored in the ROM 82.

The CPU 81 generates an authentication request from the acquired authentication code and the sewing machine distinguishing data (step S7). The authentication request is a command, to the server 60, requesting authentication relating to the function activation of the sewing machine 1, and includes the authentication code and the sewing machine distinguishing data. The CPU 81 generates a confirmation request from owned function information (step S9). The confirmation request is a command, to the server 60, requesting confirmation of the not yet installed software in the sewing machine 1, and includes the owned function information. The owned function information is information relating to the functions (that is, the installed software) owned by the sewing machine 1, and is stored in the flash memory 84. The installed software is software that is already installed in the flash memory 84 of the sewing machine 1. For example, the owned function information indicates a name and version information of all the installed software relating to the sewing machine 1. In other words, the owned function information is a current status that can identify the software already installed in the sewing machine 1.

The CPU 81 transmits the generated authentication request and confirmation request to the server 60 by wireless communication using the communication I/F 87 (step S11). The processing in the sewing machine 1 will be described separately below.

Main Processing of the Server 60

Of various processing performed by the server 60, main processing relating to the function activation of the sewing machine 1 will be explained with reference to FIG. 7. When the CPU 61 receives the authentication request and the confirmation request from the sewing machine 1 via the communication I/F 68, in the state in which the power source of the sewing machine 1 is ON, the CPU 61 performs the main processing shown in FIG. 7, on the basis of a server application in the HDD 66.

Figure 7:
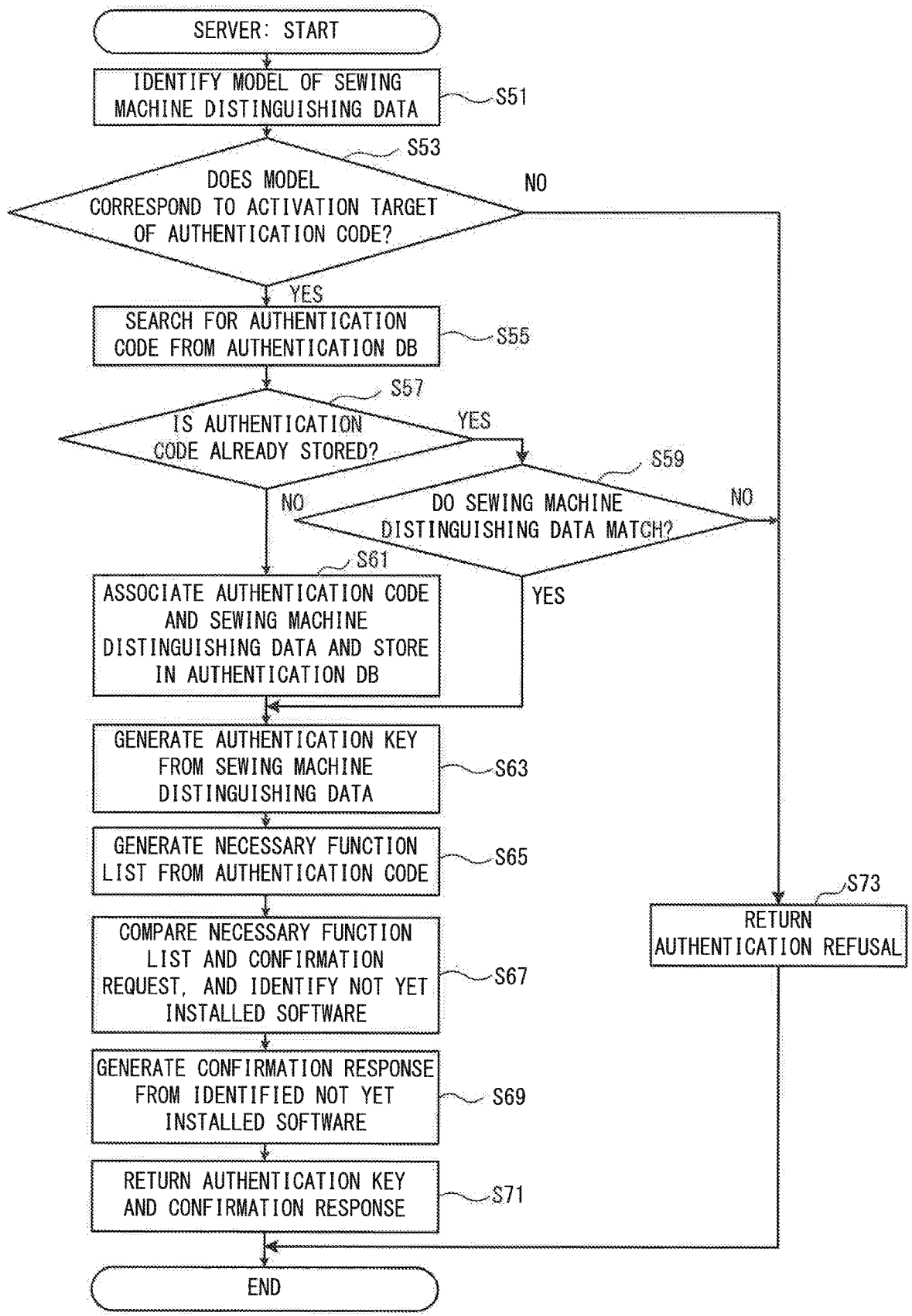
FIG. 7 is a flowchart of main processing of the server 60 according to the first embodiment.

As shown in FIG. 7, first, the CPU 61 identifies a model of the sewing machine 1 (step S51) on the basis of the sewing machine distinguishing data included in the received authentication request. Specifically, for each sewing machine model, all the sewing machine distinguishing data corresponding to that sewing machine model are associated with each other and stored in advance in the sewing machine DB 66A (refer to FIG. 5) of the HDD 66. The CPU 61 refers to the sewing machine DB 66A and identifies the sewing machine model corresponding to the received sewing machine distinguishing data.

The CPU 61 determines whether the identified sewing machine model corresponds to the activation target of the authentication code included in the received authentication request (step S53). Specifically, for each of software that can be provided to the sewing machine, all the authentication codes that are activation targets for that software, and all the sewing machine models on which that software can be used or executed (hereinafter referred to a compatible models) are associated with each other and stored in advance in the software DB 66B (refer to FIG. 5) of the HDD 66. The CPU 61 refers to the software DB 66B, identifies the software corresponding to the received authentication code, and identifies the compatible models corresponding to that software. The CPU 61 refers to the software DB 66B, and determines whether the sewing machine model identified at step S51 falls under the scope of the compatible models identified from the software DB 66B.

When the CPU 61 determines that the sewing machine model identified at step S51 does not fall under the scope of the compatible models identified from the software DB 66B, the CPU 61 determines that the sewing machine model does not correspond to the activation target of the authentication code (no at step S53). In this case, the CPU 61 performs predetermined error notification, via the communication I/F 68, returns an authentication refusal command to the sewing machine 1 (step S73), and ends the main processing shown in FIG. 7.

Further, when the CPU 61 determines that the sewing machine model identified at step S51 falls under the scope of the compatible models, the CPU 61 determines that the sewing machine model corresponds to the activation target of the authentication code (yes at step S53). In this case, the CPU 61 searches for the received authentication code from the authentication DB 66C (refer to FIG. 5) of the HDD 66 (step S55). On a basis of a search result at step S55, the CPU 61 determines whether the authentication code is already stored in the authentication DB 66C (step S57). The authentication codes included in authentication requests processed in the past, and the sewing machine distinguishing data are associated with each other and stored in the authentication DB 66C. When the CPU 61 cannot retrieve the received authentication code from the authentication DB 66C, the CPU 61 does not determine that the authentication code is already stored (step S55; no at step S57). In this case, the CPU 61 associates the received authentication code with the sewing machine distinguishing data and stores the associated data in the authentication DB 66C (step S61).

When the CPU 61 is able to retrieve the received authentication code from the authentication DB 66C, the CPU 61 determines that the authentication code is already stored (step S55; yes at step S57). In this case, the CPU 61 determines whether the sewing machine distinguishing data matches (step S59). Specifically, the CPU 61 refers to the authentication DB 66C, and identifies the sewing machine distinguishing data corresponding to the found authentication code.

When the received sewing machine distinguishing data and the sewing machine distinguishing data identified from the authentication DB 66C do not match each other (no at step S59), the CPU 61 considers there to be a history of the function activation being performed in the past on the basis of that authentication code, in a sewing machine different from the sewing machine that transmitted the authentication code. In other words, the current authentication request is that used for the function activation in a separate sewing machine using the authentication code used in the past, and therefore, it is considered that an unauthorized function activation is being requested. Thus, the CPU 61 shifts the processing to step S73. On the other hand, when the received sewing machine distinguishing data and the sewing machine distinguishing data identified from the authentication DB 66C match each other, the CPU 61 determines that the sewing machine distinguishing data match (yes at step S59). In this case, it is considered that there is a history of the function activation being performed in the past on the basis of that authentication code, in the sewing machine that has transmitted the authentication code. In other words, the current authentication request is considered to be requesting the function activation within a scope of an authorized license, such as the re-installation of the software in the same sewing machine. Thus, the CPU 61 shifts the processing to step S63.

After performing the processing at step S61, the CPU 61 generates an authentication key from the received sewing machine distinguishing data (step S63). The authentication key is data causing the sewing machine 1 that is the source of the request to perform self-authentication to show that it is the sewing machine 1 having the right to activate the activation target of the authentication code (in other words, that it is the authorized sewing machine). For example, the CPU 61 generates the authentication key by encrypting a predetermined unique key using the received sewing machine distinguishing data.

The CPU 61 generates a necessary function list from the received authentication code (step S65). The necessary function list is a table of necessary software for activating the activation target of the received authentication code, and is acquired by searching the software DB 66B. In the present embodiment, the activation target of the received authentication code is latest version firmware. Thus, the CPU 61 searches for and acquires, from the software DB 66B, the necessary function list indicating the necessary software for updating to the latest version firmware. In other words, the necessary function list is the most recent status by which the software to be installed in the sewing machine 1 can be identified.

The CPU 61 identifies the not yet installed software by comparing the generated necessary function list and the received confirmation request (step S67). Specifically, the CPU 61 identifies the installed software from the owned function information included in the confirmation request. Of the software identified using the necessary function list, the CPU 61 identifies software excluding the already installed software identified from the owned function information as the not yet installed software. The CPU 61 generates a confirmation response from the identified not yet installed software (step S69). The confirmation response is a command to the sewing machine 1, which is the transmission source of the confirmation request, as a reply regarding the not yet installed software identified at step S67. The CPU 61 returns the generated authentication key and confirmation response to the sewing machine 1, via the communication I/F 68 (step S71), and ends the main processing shown in FIG. 7.

Processing Relating to Function Activation of Sewing Machine 1: Part 2

The explanation of the processing will be returned to FIG. 6. After performing the processing at step S11, the CPU 81 of the sewing machine 1 receives the authentication key and the confirmation response from the server 60, through the wireless communication using the communication I/F 87 (step S13). In the present embodiment, the CPU 81 performs control such that the up and down movement of the needle bar 6 by the needle bar up-and-down movement mechanism 55 can be performed from a time point at which the CPU 81 receives the authentication key and the confirmation response (specifically, from a time at which the processing at step S13 ends). Specifically, the sewing operation of the sewing machine 1 is allowed from the time point at which the transmission and reception of the authentication code between the sewing machine 1 and the server 60 is complete.

When a communication error occurs at the time of the reception of the authentication key and the confirmation response (yes at step S15), the CPU 81 shifts the processing to step S25. On the other hand, when a communication error does not occur at the time of the reception of the authentication key and the confirmation response (no at step S15), the CPU 81 determines whether the received authentication key is correct (step S17). For example, the CPU 81 decrypts the received authentication key using the sewing machine distinguishing data calculated from the authentication information in a similar manner to step S5. When the decrypted data matches a predetermined unique key, the CPU 81 determines that the authentication key is correct (yes at step S17). On the other hand, when the CPU 81 determines that the authentication key is not correct (no at step S17), the CPU 81 shifts the processing to step S25.

In this case, the CPU 81 determines whether there is the not yet installed software, on the basis of the received confirmation response (step S19). Specifically, when the CPU 81 can identify the not yet installed software from the received confirmation response, the CPU 81 determines that there is the not yet installed software (yes at step S19). In this case, the CPU 81 performs installation processing of the not yet installed software identified from the confirmation response (step S21). Specifically, the CPU 81 downloads the identified not yet installed software from the software DB 66B, through the wireless communication using the communication I/F 87, and installs the downloaded software in the flash memory 84. In the present embodiment, during a period in which the installation processing is being performed at step S21, the CPU 81 displays a guidance screen relating to the software being installed on the display 15. On the other hand, when there is not the not yet installed software (no at step S19), the CPU 81 shifts the processing to step S23. In this way, even when there is not the not yet installed software, if an enable flag corresponding to the software identified by the confirmation response is "OFF," the enable flag is set to "ON." Although not shown in the drawings, after performing the processing at step S11, when the CPU 81 has received the authentication refusal command from the server 60, the CPU 81 shifts the processing to step S25. After the processing at step S25, the CPU 81 ends the main processing shown in FIG. 6.

At step S21, the CPU 81 stores an enable flag indicating whether to enable the activation target software in the flash memory 84. At this time point, the enable flag is set to "OFF" and the activation target software is disabled. Specifically, in the present embodiment, the software provided from the server 60 is not in a state of being able to be used or executed simply by the software being installed in the sewing machine 1. If the enable flag corresponding to the installed software is "ON," the CPU 81 allows the use or execution of that software.

After the processing at step S21, the CPU 81 performs writing of authentication completion information (step S23). The authentication completion information indicates that the software installed at step S21 has obtained the proper authentication. Specifically, as the writing of the authentication complete information, the CPU 81 sets the enable flag corresponding to the installed software to "ON." In this way, in the sewing machine 1, the installed software is activated, and from then on, that software can be used or executed. After that, the CPU 81 ends the main processing shown in FIG. 6.

Authentication Code Acquisition Processing of Sewing Machine 1

Figure 8:
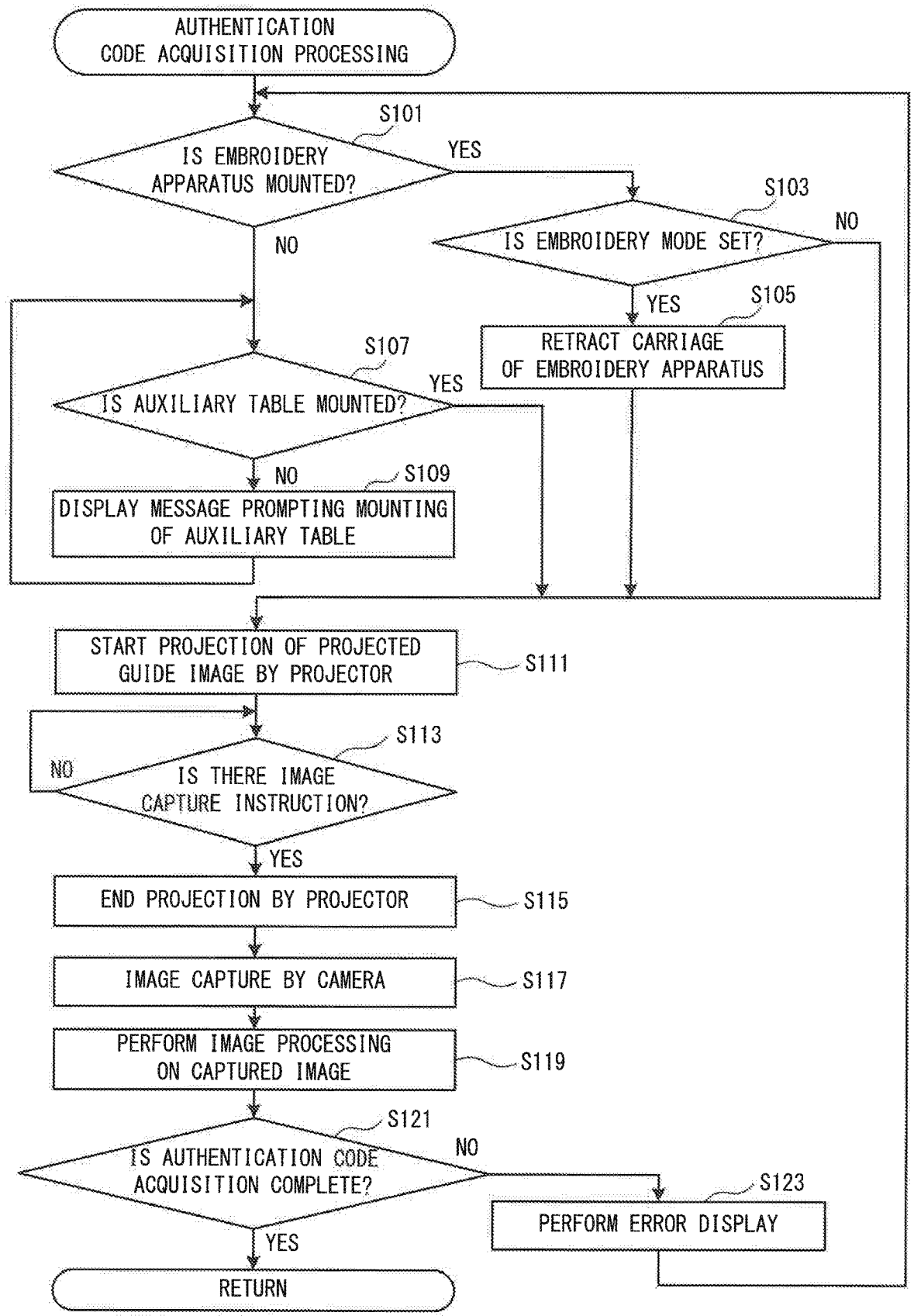
FIG. 8 is a flowchart of authentication code acquisition processing according to the first embodiment.

The authentication code acquisition processing (step S1) performed in the main processing of the sewing machine 1 will be explained with reference to FIG. 8. First, the CPU 81 determines whether the embroidery apparatus 40 is mounted on the bed portion 11 of the sewing machine 1 (step S101). When the embroidery apparatus 40 is mounted (yes at step S101), the CPU 81 determines whether the operation mode of the sewing machine 1 is an embroidery mode (step S103). For example, when the operation mode of the sewing machine 1 is set to the embroidery mode by a panel operation, the CPU 81 determines that the operation mode is the embroidery mode (yes at step S103). The embroidery mode is the operation mode in which the embroidery sewing is performed using the embroidery frame 50 described above.

Figure 9:
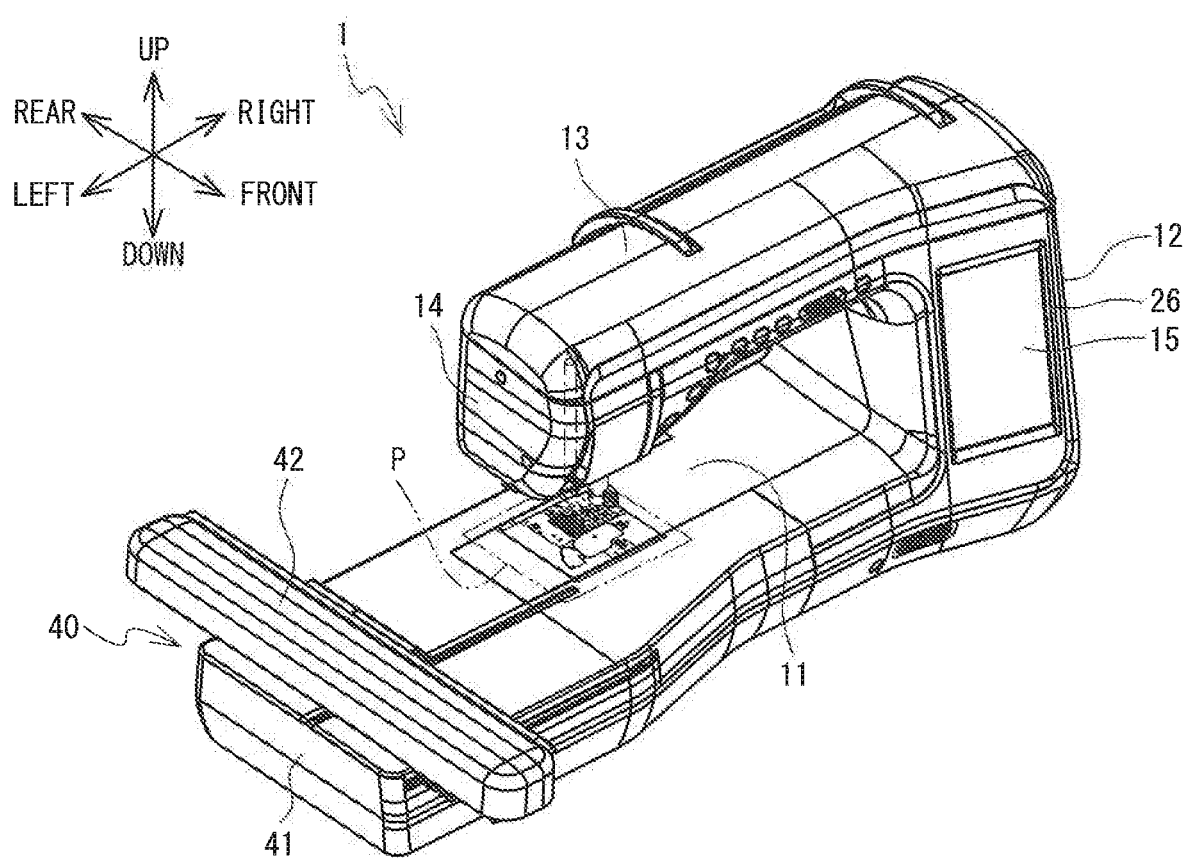
FIG. 9 is a perspective view of the sewing machine 1 when a carriage 42 is in a retracted position.

In this case, the CPU 81 retracts the carriage 42 of the embroidery apparatus 40 (step S105). Specifically, the CPU 81 moves the carriage 42 to a position in which the embroidery frame 50 mounted on the carriage 42 is separated from the image capture range P. In the present embodiment, the carriage 42 is moved in the leftward direction as far as a retracted position at a left end portion of a movable range of the carriage 42 in the left-right direction (the X axis direction). In this way, as shown in FIG. 9, in a state in which the carriage 42 has been moved to the retracted position, even if the embroidery frame 50 is mounted on the carriage 42, the embroidery frame 50 is separated from the image capture range P. After performing the processing at step S105, the CPU 81 shifts the processing to step S111.

Figure 10:
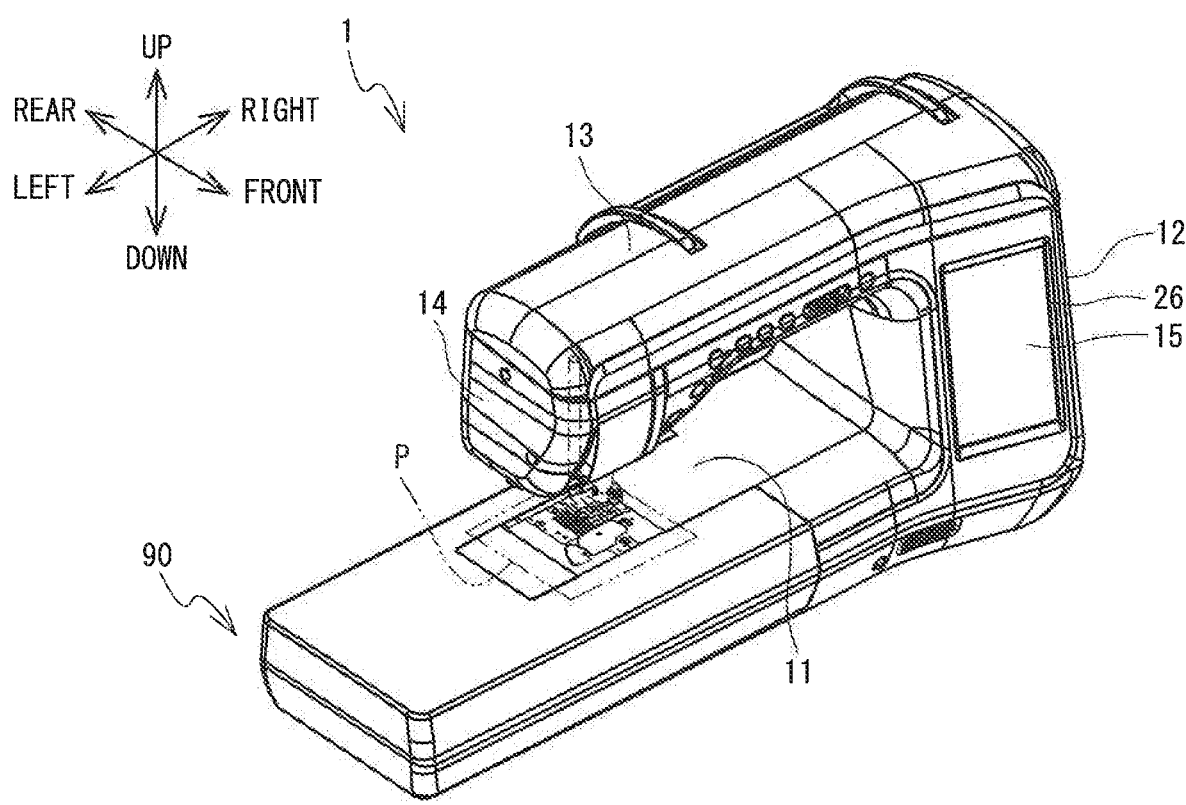
FIG. 10 is a perspective view of the sewing machine 1 when an auxiliary table 90 is mounted.

When the embroidery apparatus 40 is not mounted (no at step S101), the CPU 81 determines whether an auxiliary table 90 is mounted on the bed portion 11 of the sewing machine 1 (step S107). As shown in FIG. 10, the auxiliary table 90 is a table that can be removably mounted on the bed portion 11. When the user is to perform the normal sewing operation that is not the embroidery sewing, the auxiliary table 90 is mounted on the bed portion 11 from which the embroidery apparatus 40 has been removed, and is used (refer to FIG. 10). When the auxiliary table 90 is not mounted (no at step S107), the CPU 81 displays a message on the display 15 prompting the mounting of the auxiliary table 90 (step S109), and returns the processing to step S107. Note that, at step S109, it is sufficient that notification prompting the mounting of the auxiliary table 90 is performed. For example, as the notification prompting the mounting of the auxiliary table 90, in place of the display of the message, or in combination with the display of the message, voice, music, moving images and the like prompting the mounting of the auxiliary table 90 may be output, or an LED and the like may be illuminated or be caused to flash on and off.

Note that, when the operation mode is not the embroidery mode (no at step S103), the operation mode of the sewing machine 1 is set to a practical mode for performing the normal sewing operation that is not the embroidery sewing. In this case, since the carriage 42 is controlled to be in the state of having been moved in advance to the retracted position, the CPU 81 shifts the processing to step S111. Further, when the auxiliary table 90 is mounted on the bed portion 11 (yes at step S107), since the sewing machine 1 is in the state of not using the embroidery frame 50, the CPU 81 shifts the processing to step S111.

Figure 11:
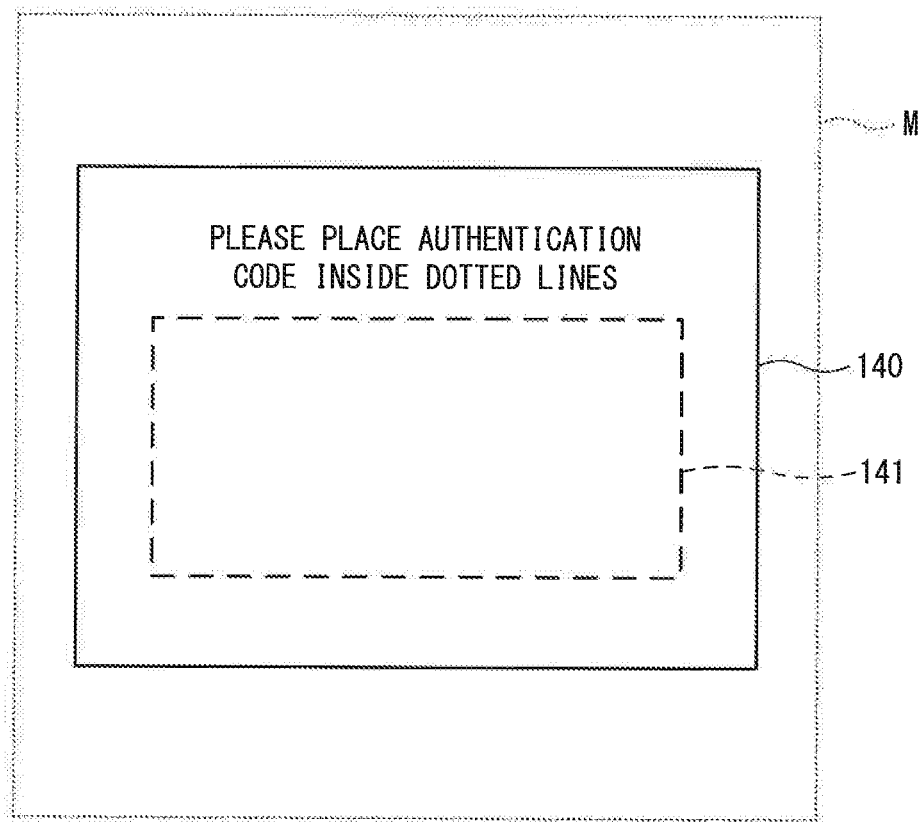
FIG. 11 is a diagram showing an example of a projected guide image 140.

The CPU 81 drives the projector 58 and starts the projection of the projected guide image 140 (step S111). In this way, the projected guide image 140 showing a recommended position to arrange the authentication code is projected onto the projectable region M below the head portion 14. As shown in FIG. 11, the projected guide image 140 includes a recommended position image 141 showing a recommended arrangement region in which the authentication code can be accurately captured by the camera 57. The user arranges the printed object Q on the bed portion 11 so that the authentication code is contained within the recommended arrangement region of the recommended position image 141.

Next, the CPU 81 determines whether there is an image capture instruction (step S113). When there is no image capture instruction (no at step S113), the CPU 81 returns the processing to step S113, and stands by to receive the image capture instruction. When the image capture instruction has been input by a panel operation, the CPU 81 determines that there is the image capture instruction (yes at step S113). In this case, the CPU 81 ends the projection of the projected guide image 140 by the projector 58 (step S115). The CPU 81 drives the camera 57 and captures the image of the image capture range P (step S117), and performs image processing on the captured image (step S119). In the present embodiment, when the camera 57 performs the image capture, the CPU 81 drives illumination provided in the sewing machine 1 (the light source 58D, for example), and illuminates the image capture range P.

The CPU 81 determines whether the acquisition of the authentication code is complete (step S121). Specifically, when it has been possible to acquire the authentication code from the captured image on which the image processing has been performed, the CPU 81 determines that the acquisition of the authentication code is complete (yes at step S121). In this case, the CPU 81 ends the authentication code acquisition processing, and returns the processing to the main processing (refer to FIG. 6). When it has not been possible to acquire the authentication code (no at step S121), the CPU 81 outputs the predetermined error display to the display 15 in a similar manner to step S25 (step S123), and returns the processing to step S101.

Second Embodiment

A second embodiment of the present disclosure will be explained with reference to FIG. 12 and FIG. 13. In the following explanation, configurations and processing that are the same as those of the first embodiment will be assigned the same reference signs and an explanation thereof will be omitted, and the explanation will be made concentrating on points that are different from the first embodiment. The physical configurations of the software activation system 100, the sewing machine 1, and the server 60 according to the second embodiment are the same as those of the first embodiment. Whereas in the first embodiment the server 60 identifies the not yet installed software of the sewing machine 1, in the second embodiment, the sewing machine 1 identifies the not yet installed software of the sewing machine 1.

Main processing of the sewing machine 1 according to the second embodiment will be explained with reference to FIG. 12. The main processing of the second embodiment differs from the main processing of the first embodiment (refer to FIG. 6) in the following points. As shown in FIG. 12, after performing the processing at step S7, the CPU 81 transmits the generated authentication request to the server 60 (step S31). That is, in the second embodiment, in contrast to the first embodiment, the sewing machine 1 does not generate and transmit the confirmation request. Note however that the authentication request functions as the confirmation request enquiring whether or not the function activation of the sewing machine 1 is necessary (in other words, whether the upgrade is necessary). The processing in the sewing machine 1 is described separately below.

Main processing of the server 60 according to the second embodiment will be explained with reference to FIG. 13. The main processing of the second embodiment differs from the main processing of the first embodiment (refer to FIG. 7) in the following points. As shown in FIG. 13, after performing the processing at step S65, the CPU 61 generates the confirmation response from the generated necessary function list (step S81). In other words, the CPU 61 generates the confirmation response including the necessary function list. The generated authentication key and confirmation response are returned to the sewing machine 1 (step S71). Other processing is the same as that of the first embodiment.

Figure 12:
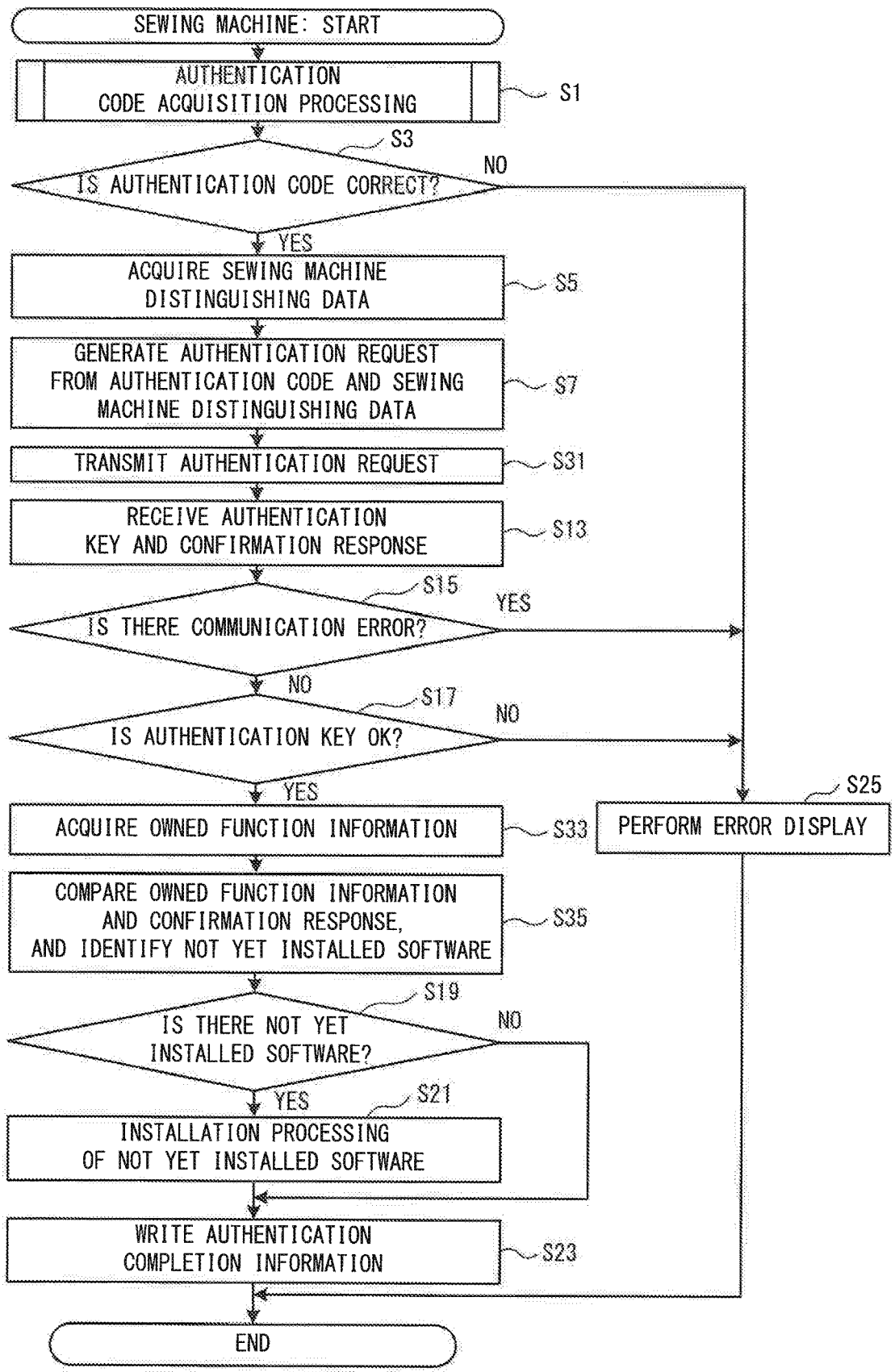
FIG. 12 is a flowchart of main processing of the sewing machine 1 according to a second embodiment.
Figure 13:
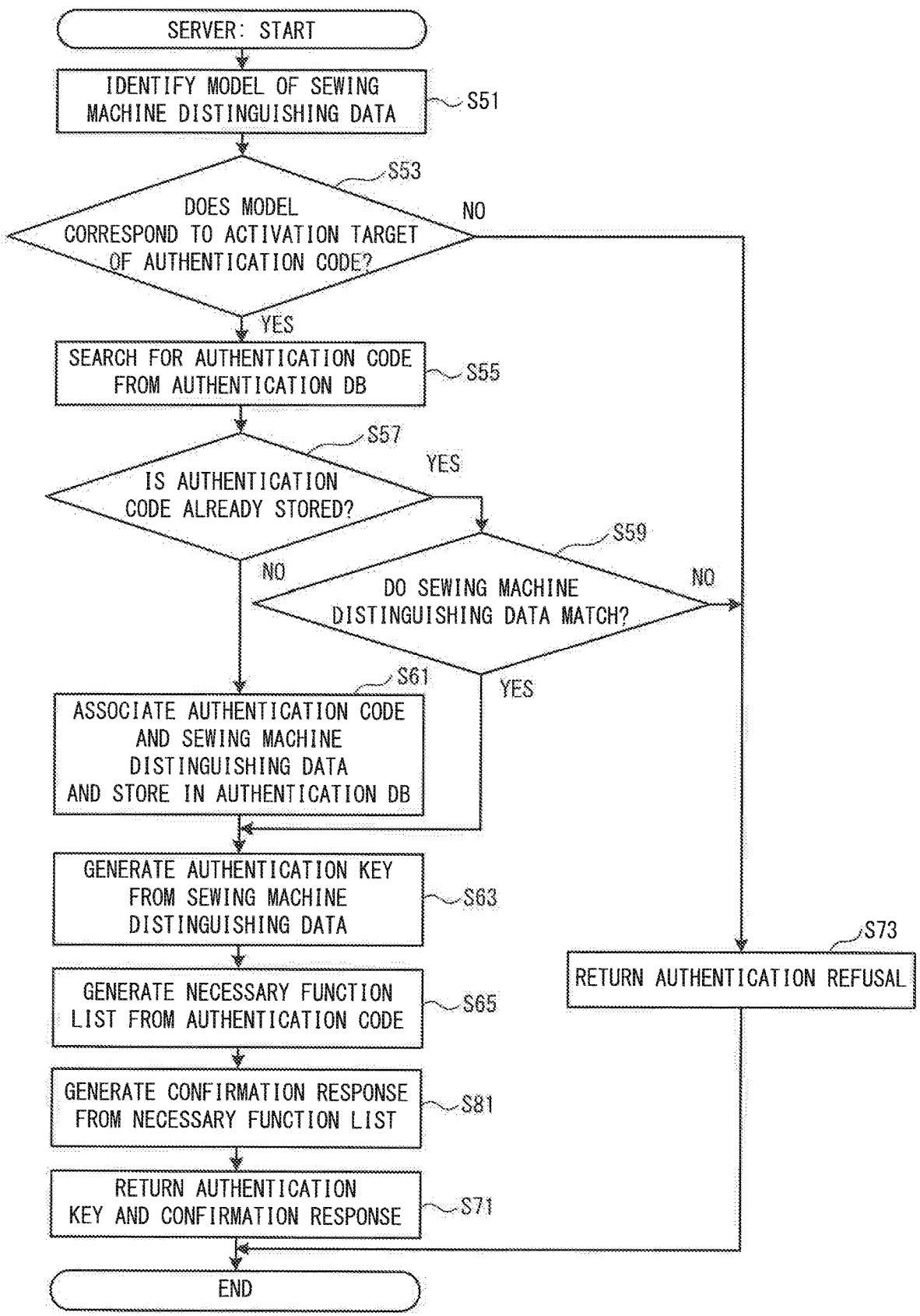
FIG. 13 is a flowchart of main processing of the server 60 according to the second embodiment.

The explanation of the processing will be returned to FIG. 12. After performing the processing at step S7, the CPU 81 performs the processing from step S13 to step S17, in a similar manner to the first embodiment (refer to FIG. 6). When the authentication key is correct (yes at step S17), the CPU 81 acquires the above-described owned function information (step S33). The CPU 81 compares the acquired owned function information with the received confirmation response, and identifies the not yet installed software (step S35). Specifically, of the software identified using the necessary function list included in the confirmation request, the CPU 81 identifies the software excluding the already installed software identified from the owned function information as the not yet installed software. When the not yet installed software is identified at step S35, the CPU 81 determines that there is the not yet installed software (yes at step S19), and performs the installation processing of the not yet installed software (step S21). The other processing is the same as that of the first embodiment.

Third Embodiment

Figure 14:
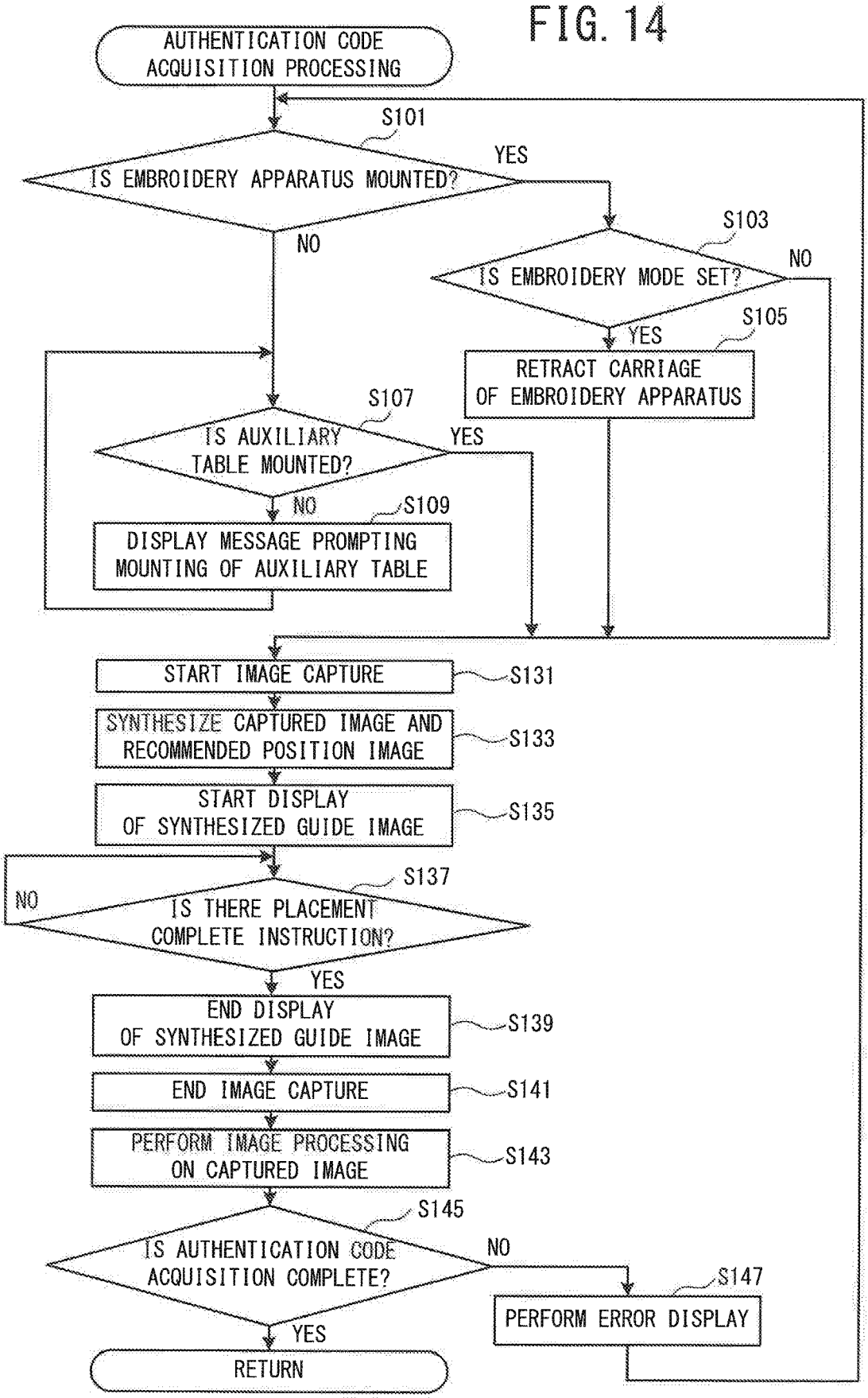
FIG. 14 is a flowchart of authentication code acquisition processing according to a third embodiment.

A third embodiment of the present disclosure will be explained with reference to FIG. 14 and FIG. 15. In the following explanation, configurations and processing that are the same as those of the first embodiment will be assigned the same reference signs and an explanation thereof will be omitted, and the explanation will be made concentrating on points that are different from the first embodiment. The physical configurations of the software activation system 100, the sewing machine 1, and the server 60 of the third embodiment are the same as those of the first embodiment. Whereas in the first embodiment, the image indicating the recommended position to place the authentication code is projected onto the top surface of the bed portion 11 by the projector 58, in the third embodiment, an image indicating the recommended position to place the authentication code is displayed on the display 15.

Authentication code acquisition processing of the sewing machine 1 according to the third embodiment will be explained with reference to FIG. 14. The authentication code acquisition processing of the third embodiments differs from the authentication code acquisition processing (refer to FIG. 8) of the first embodiment in the following points. As shown in FIG. 14, in place of the processing from step S111 onward, the CPU 81 performs processing from step S131 onward. Specifically, the CPU 81 drives the camera 57 and starts the image capture of the image capture range P (step S131). The CPU 81 synthesizes a captured image 151 during image capture by the camera 57 and a recommended position image 152, generates a synthesized guide image 150 (step S133), and starts display of the generated synthesized guide image 150 on the display 15 (step S135).

Figure 15:
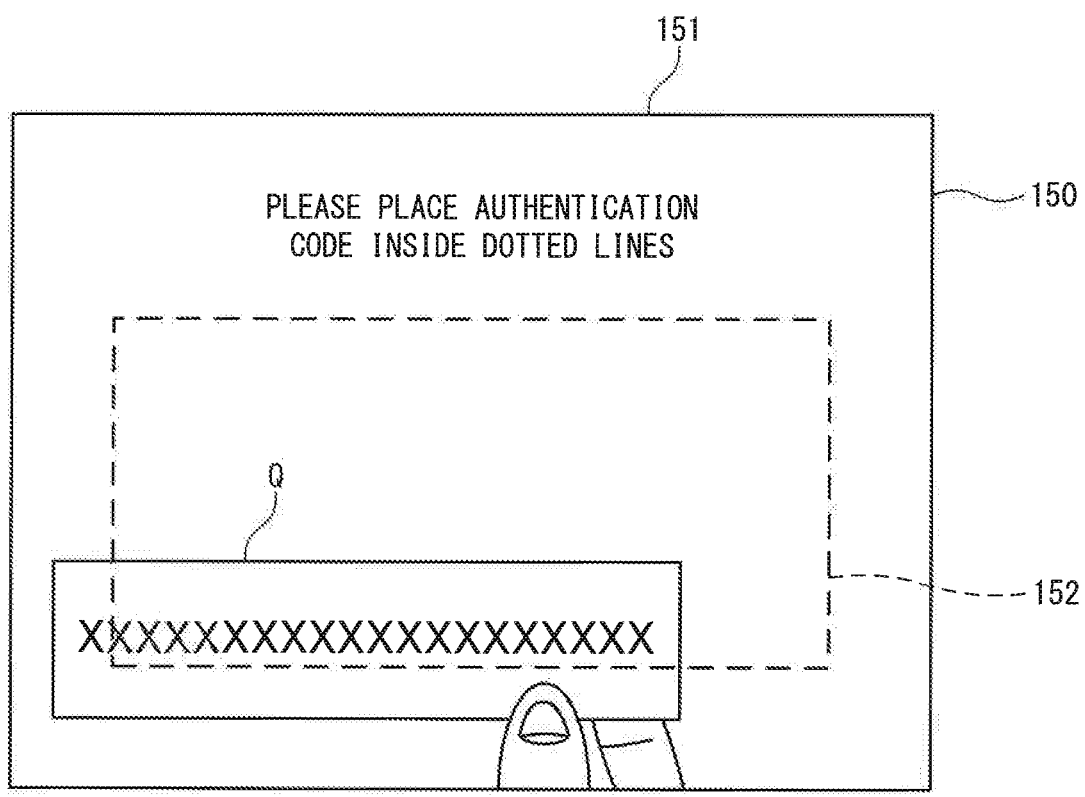
FIG. 15 is a diagram showing an example of a synthesized guide image 150.

As shown in FIG. 15, in the synthesized guide image 150, the recommended position image 152 is displayed so as to be superimposed on the captured image 151 during the image capture by the camera 57. The recommended position image 152 indicates a recommended placement region in which the camera 57 can accurately capture the authentication code. For example, in the captured image 151, the printed object Q placed on the bed portion 11 by the user is displayed in real time. The user places the printed object Q on the bed portion 11 while referring to the synthesized guide image 150, such that the authentication code is contained within the recommended placement region of the recommended position image 152.

Next, the CPU 81 determines whether there is a placement complete instruction (step S137). When there is not the placement complete instruction (no at step S137), the CPU 81 returns the processing to step S138 and stands by to receive the placement complete instruction. When the placement complete instruction has been input by a panel operation, the CPU 81 determines that there is the placement complete instruction (yes at step S137). In this case, the CPU 81 ends the display of the synthesized guide image 150 (step S139), and ends the image capture by the camera 57 (step S141). The CPU 81 performs image processing on the captured image at a time point at which the placement complete instruction is input, for example (step S143). Similarly to step S121, the CPU 81 determines whether the acquisition of the authentication code is complete (step S145). When the acquisition of the authentication code is complete (yes at step S145), the CPU 81 ends the authentication code acquisition processing, and returns the processing to the main processing (refer to FIG. 6). When the acquisition of the authentication code is not complete (no at step S145), the CPU 81 outputs the predetermined error display to the display 15 in a similar manner to step S123 (step S147), and returns the processing to step S101.

Remarks Relating to Above-Described Embodiments

The software activation system 100 disclosed in the first to third embodiments includes the sewing machine 1 and at least one of the servers 60 connected via the network 100A. The CPU 81 of the sewing machine 1 acquires the authentication code corresponding to the activation target (step S1). The CPU 81 transmits, to the server 60, the authentication request including the acquired authentication code (step S11, step S31). The CPU 81 receives the authentication key from the server 60 (step S13). The CPU 81 determines whether the received authentication key satisfies predetermined authentication conditions (step S17). When the CPU 81 determines that the authentication key satisfies the authentication conditions, the CPU 81 activates the activation target on the sewing machine 1 (step S21, step S23). When the CPU 61 of the server 60 receives the authentication request from the sewing machine 1, the CPU 61 acquires the authentication key on the basis of the authentication request (step S63). The CPU 61 transmits the acquired authentication key to the sewing machine 1 (step S71).

In this way, simply by the user causing the sewing machine 1 to acquire the authentication code, whether the sewing machine 1 is authorized is automatically authenticated, and the activation target is automatically activated in the sewing machine 1. Thus, in order for the user to perform the function activation on the sewing machine 1, there is no need to read the activation target software from a CD-ROM via a PC, or to input the sewing machine number or CD key from a keyboard of the PC and the like, as in the related art. Thus, the user can realize the function activation of the sewing machine 1 more easily and with less effort.

In the first to third embodiments, the sewing machine 1 is provided with the ROM 82 that stores the distinguishing information unique to the sewing machine 1. The authentication request includes the sewing machine distinguishing data that is unique to the sewing machine 1 and that is generated on the basis of the distinguishing information in the ROM 82. The CPU 61 of the server 60 acquires the authentication key (step S63) on the basis of the sewing machine distinguishing data included in the authentication request. The CPU 81 of the sewing machine 1 determines whether the authentication key satisfies the authentication conditions (step S17) on the basis of the distinguishing information in the ROM 82. In this way, on the basis of that distinguishing information, the sewing machine 1 can self-authenticate as to whether the sewing machine 1 has the authority to activate the activation target of the authentication code.

In the first to third embodiments, the authentication request includes the model identification information (the sewing machine distinguishing data) identifying the model of the sewing machine 1. The CPU 61 of the server 60 identifies the sewing machine model (step S51) on the basis of the model identification information included in the authentication request. On the basis of the identified sewing machine model, the CPU 61 determines whether the sewing machine 1 is the compatible model for the activation target (step S53). When the sewing machine 1 is not determined to be the compatible model, the CPU 61 performs the predetermined error notification to the sewing machine 1 (step S73). In this way, when the sewing machine 1 is not the model compatible with the activation target, it is possible to prevent the activation target from being activated on the sewing machine 1.

In the first to third embodiments, the CPU 81 of the sewing machine 1 transmits, to the server 60, the confirmation request requesting the identification information to identify the not yet installed software (step S11). The CPU 81 receives, from the server 60, the confirmation response including the identification information (step S13). The CPU 81 installs the not yet installed software in the sewing machine 1 (step S21, step S23). When the CPU 61 of the server 60 receives the confirmation request from the sewing machine 1, the CPU 61 acquires the identification information on the basis of the confirmation request (step S65, step S67). The CPU 61 transmits, to the sewing machine 1, the confirmation response including the acquired identification information (step S71). In this way, on the basis of the confirmation response received from the server 60, the sewing machine 1 can identify the functions (that is, the software to be installed) that can be activated on the sewing machine 1.

In the first embodiment, the sewing machine 1 is provided with the flash memory 84 that stores the current status by which the already installed software can be identified in the sewing machine 1. The confirmation request includes the current status stored in the flash memory 84. The server 60 is provided with the software DB 66B that stores the most recent status by which the software to be installed in the sewing machine 1 can be identified. On the basis of the current status included in the confirmation request, and the most recent status stored in the software DB 66B, the CPU 61 of the server 60 identifies the software to be installed in the sewing machine 1, and acquires the identified not yet installed software as the identification information (step S67). In this way, in the server 60 that is the destination of the request, the software to be installed in the sewing machine 1 can be identified.

In the second embodiment, the sewing machine 1 is provided with the flash memory 84 that stores the current status by which the already installed software can be identified in the sewing machine 1. The server 60 is provided with the software DB 66B that stores the most recent status by which the software to be installed in the sewing machine 1 can be identified. The identification information is the most recent status stored in the software DB 66B. On the basis of the most recent status included in the confirmation response, and the current status stored in the flash memory 84, the CPU 81 of the sewing machine 1 identifies the software to be installed in the sewing machine 1, and installs the identified not yet installed software in the sewing machine 1 (step S35, step S21, step S23). In this way, in the sewing machine 1 that is the source of the request, the not yet installed software that is to be installed in the sewing machine 1 can be identified.

In the second embodiment, the confirmation server that receives the confirmation request and returns the confirmation response, and the authentication server that receives the authentication request and returns the authentication key are the same server 60. The CPU 81 of the sewing machine 1 transmits the authentication request, which functions as the confirmation request, to the server 60 (step S31). In this way, the sewing machine 1 can eliminate a processing load to generate and transmit the confirmation request.

In the first to third embodiments, the sewing machine 1 is provided with the needle bar 6 on which the sewing needle 6A is mounted, and the needle bar up-and-down movement mechanism 55 that moves the needle bar 6 up and down. During the period from the time at which the state is obtained in which the authentication code can be acquired until the authentication key is received, the CPU 81 of the sewing machine 1 performs control such that the up and down movement of the needle bar 6 by the needle bar up-and-down movement mechanism 55 cannot be performed (step S1 to step S13). In this way, since the sewing machine 1 prohibits the sewing operation during the period in which the authentication code can be acquired, the camera 57 can accurately capture the image of the authentication code.

In the first to third embodiments, the sewing machine 1 is provided with the camera 57 that can capture the image of the predetermined image capture range. The CPU 81 of the sewing machine 1 acquires the authentication code on the basis of the image captured by the camera 57 (step S117 to step S121, step S131 to step S145). In this way, the user can cause the sewing machine 1 to acquire the authentication code by a simple operation of capturing the image of the authentication code using the camera 57, and it is thus possible to suppress an input mistake of the authentication code and an operation load on the user.

In the first to third embodiments, the sewing machine 1 is further provided with the bed portion 11, and the arm portion 13 that is disposed above the bed portion 11. The camera 57 is provided in the lower surface of the arm portion 13. In this way, the image of the authentication code can be captured using the camera 57 that can capture the image of the sewing object C placed on the bed portion 11. Thus, in the sewing machine 1, there is no need to separately provide a dedicated camera for performing the image capture of the authentication code.

In the first to third embodiments, the sewing machine 1 is provided with the embroidery apparatus 40 that can move the embroidery frame 50 in the directions orthogonal to the up-down direction, above the bed portion 11 and below the arm portion 13. When the CPU 81 of the sewing machine 1 causes the camera 57 to perform the image capture, the CPU 81 uses the embroidery apparatus 40 to move the embroidery frame 50 to the position separated from the image capture range P of the image capture by the camera 57 (step S105). In this way, at the time of the image capture of the authentication code by the camera 57, it is possible to suppress the embroidery frame 50 from causing interference in the image capture range P.

In the first to third embodiments, the sewing machine 1 is provided with the auxiliary table 90 that can be detachably mounted on the bed portion 11. When the CPU 81 of the sewing machine 1 causes the camera 57 to perform the image capture, the CPU 81 performs notification prompting the mounting of the auxiliary table 90 on the bed portion 11 (step S109). In this way, it is easier for the user to place the authentication code in the image capture range P on the bed portion 11 when the auxiliary table 90 is mounted on the bed portion 11.

In the first to third embodiments, the sewing machine 1 is provided with the light source 58D that can illuminate at least the image capture range P. When the CPU 81 of the sewing machine 1 causes the camera 57 to perform the image capture, the CPU 81 causes the light source 58D to illuminate the image capture range P (step S117, step S131).

In this way, the sewing machine 1 can accurately capture the image of the authentication code placed in the image capture range P using the camera 57. Note that, in place of the light source 58D, the image capture range P may be illuminated using a light (an LED, for example) provided in the sewing machine 1.

In the first embodiment, the sewing machine 1 is provided with the projector 58 that is provided in the lower surface of the arm portion 13 and that can project the image. When the CPU 81 of the sewing machine 1 causes the camera 57 to perform the image capture, the CPU 81 causes the projector 58 to project the recommended position image 141 indicating the recommended position in which to place the authentication code in the image capture range P (step S111). In this way, the user can refer to the recommended position image 141 and can place the authentication code in a more accurate image capture position.

In the third embodiment, the sewing machine 1 is provided with the display 15. When the CPU 81 of the sewing machine 1 causes the camera 57 to perform the image capture, the CPU 81 synthesizes the captured image 151 acquired from the camera 57 with the recommended position image 152 indicating the recommended position in which to place the authentication code in the image capture range P, and causes the synthesized image to be displayed on the display 15 (step S135). In this way, the user can refer to the recommended position image 152 and can place the authentication code in a more accurate image capture position.

In the above-described embodiments, the sewing machine 1 is provided with the display 15. During the period in which the processing to install the not yet installed software in the sewing machine 1 is being performed, the CPU 81 of the sewing machine 1 causes the guidance screen relating to the not yet installed software to be displayed on the display 15 (step S21). In this way, by using the stand-by period during the software installation processing to refer to the guidance screen relating to the software, the user can ascertain details about new functions and new data.

Other Modified Examples

The present disclosure is not limited to the above-described embodiments, and various modifications are possible. In the above-described embodiments, the example is explained for the case of the version upgrade of the firmware on the sewing machine 1. However, it goes without saying that the present disclosure can also be applied when newly installing or updating a desired program (a sewing machine-dedicated application, for example) in the sewing machine 1, or when newly installing or updating desired data on the sewing machine 1 (sewing data, for example). In this case, the user may input, into the sewing machine 1, the authentication code corresponding to the desired application or data.

In the above-described embodiments, the case is exemplified in which the authentication of and software provision to the sewing machine 1 is performed using the single server 60, but the processing may be performed by distributed processing by a plurality of the servers 60 connected to the network 100A. For example, the plurality of servers 60 may include a confirmation server that receives the confirmation request and returns the confirmation response, and an authentication server that receives the authentication request and returns the authentication key.

The sewing machine 1 may download the not yet installed software from the server 60 other than the server 60 that is the transmission source of the authentication key. For example, the server 60 that is the transmission source of the authentication key may return, to the sewing machine 1, the confirmation response including information identifying the not yet installed software, and information relating to an address (hereinafter referred to as a provision source address) of the other server 60 that provides the not yet installed software (step S71). The information relating to the provision source address is, for example, part or all of a URL indicating the provision source address. The CPU 81 of the sewing machine 1 generates the provision source address of the identified not yet installed software from the information relating to the provision source address included in the confirmation response, and acquires and installs the not yet installed software from the server 60 of the generated provision source address (step S21). In this way, the sewing machine 1 can easily acquire the not yet installed software from the other server 60 that is the provision source.

In the above-described embodiments, the sewing machine 1 transmits the authentication request and the confirmation request at the same timing (step S11), and the server 60 returns the authentication key and the confirmation response at the same timing (step S71), but the present disclosure is not limited to this example. The sewing machine 1 may transmit the authentication request and the confirmation request at different timings. The server 60 may transmit the authentication key and the confirmation response at different timings.

For example, the confirmation server that receives the confirmation request and returns the confirmation response, and the authentication server that receives the authentication request and returns the authentication key are the same server 60. The CPU 81 of the sewing machine 1 first transmits the authentication request to the server 60, and receives the authentication key from the server 60. The CPU 81 may transmit the confirmation request to the server 60 when the CPU 81 determines that the authentication key satisfies the authentication conditions, (yes at step S17). In this way, when the authentication key does not satisfy the authentication conditions, the sewing machine 1 can reduce the processing load by not performing the processing to install the not yet installed software.

In the above-described embodiments, the sewing machine 1 acquires the authentication code as a result of capturing the image of the authentication code using the camera 57, but the authentication code can be acquired using various methods. For example, when the sewing machine 1 is provided with a physical key (not shown in the drawings), the CPU 81 may acquire the input authentication code using the physical key. When the sewing machine 1 is provided with the touch panel 26, the CPU 81 may acquire the input authentication code using the touch panel 26. When the sewing machine 1 is provided with a known voice recognition function, the CPU 81 may acquire the input authentication code using the voice of the user.

In the above-described embodiments, the case is exemplified in which the activation target corresponding to the authentication code is activated on the sewing machine 1, but the present disclosure is not limited to this example. Specifically, the present disclosure can also be applied to a case in which the not yet installed software is activated on the sewing machine 1 irrespective of the authentication code. Further, in the above-described embodiments, processing relating to the function activation is performed when triggered by the user inputting the authentication code into the sewing machine 1, but the present disclosure is not limited to this example. Specifically, the present disclosure can also be applied to a case in which the not yet installed software is activated on the sewing machine 1 at a timing not related to the authentication code.

For example, in the second embodiment, the authentication request may be transmitted from the sewing machine 1 to the server 60 regularly or irregularly, irrespective of the input of the authentication code. In this case, the authentication request does not include the authentication code, but functions as the confirmation request requesting confirmation of the necessity to perform the upgrade, in a similar manner to that described above. Further, a notification command indicating the most recent status, in a similar manner to the confirmation response, may be transmitted from the server 60 to the sewing machine 1 regularly or irregularly, irrespective of the input of the authentication code. In this case, the sewing machine 1 may refer to the owned function information and the notification command, and may install the not yet installed software in a similar manner to that described above.

In the above-described embodiments, during the period from the time at which the state is obtained in which the authentication code can be acquired until the authentication key is received (step S1 to step S13), the sewing operation of the sewing machine 1 is prohibited, but it goes without saying that from step S15 onward, the sewing operation of the sewing machine 1 is allowed. Therefore, the user can, for example, use an installation stand-by time occurring due to the processing to install the not yet installed software (step S21) to perform the sewing operation using the sewing machine 1. In this case, as an extra benefit during the installation stand-by time, the sewing machine 1 may be configured to be able to sew a special embroidery pattern or practical pattern exclusively during the installation stand-by time.

In the above-described embodiments, when the sewing machine distinguishing data do not match each other (no at step S59), the CPU 61 shifts to step S73 and returns the authentication refusal, but the present disclosure is not limited to this example. For example, when a plurality of licenses are issued for the one authentication code, it is possible to associate the sewing machine distinguishing data with an upper limit corresponding to the number of licenses for the one authentication code, and to store the associated data in the authentication DB 66C. In other words, when the sewing machine distinguishing data do not match each other (no at step S59), when the sewing machine distinguishing data stored in the authentication DB 66C in association with the authentication code is lower than the number of licenses, the CPU 61 may perform the processing at step S61 without issuing the authentication refusal.

Note that, in place of the CPU, a microcomputer, an application specific integrated circuit (ASIC), a field programmable gate array (FPGA) or the like may be used as a processor. The main processing and the authentication code acquisition processing may be performed as distributed processing by a plurality of processors. An HDD may be configured by another non-transitory storage medium, such as a flash memory and/or a ROM or the like, for example. It is sufficient that the non-transitory storage medium be a storage medium capable of storing information, irrespective of a period of storage of the information. The non-transitory medium need not necessarily include a transitory storage medium (a transmitted signal, for example). A program may be, for example, downloaded from a server connected to a network (not shown in the drawings) (in other words, may be transmitted as a transmission signal), and stored in an HDD. In this case, the program may be stored in the non-transitory storage medium, such as the HDD, provided in the server.

What is claimed is:

1. A software activation system comprising:
a sewing machine and at least one server connected via a network,
wherein
the sewing machine includes:
a first storage device configured to store distinguishing information unique to the sewing machine;
a processor and a memory storing computer-readable instructions that, when executed by the processor, cause the processor to perform processes comprising:
acquiring an authentication code corresponding to an activation target software that is at least one of a program and data not activated on the sewing machine; and
transmitting, to an authentication server included in the at least one server, an authentication request including the acquired authentication code, the authentication request including individual identification information unique to the sewing machine, the individual identification information being generated on the basis of the distinguishing information acquired from the first storage device, and
the server includes a first receiver configured to receive the authentication request from the sewing machine, a processor, and a memory storing computer-readable instructions that, when executed by the processor, cause the processor to perform processes comprising:
acquiring an authentication key on the basis of the authentication request, when the authentication request is received by the first receiver, the acquiring of the authentication key including acquiring the authentication key on the basis of the individual identification information included in the authentication request; and
transmitting the acquired authentication key to the sewing machine, and
the computer-readable instructions stored in the memory of the sewing machine further cause the processor of the sewing machine to perform processes comprising:
receiving the authentication key from the authentication server;
determining whether the received authentication key satisfies a predetermined authentication condition by determining whether the authentication key satisfies the authentication condition on the basis of the distinguishing information stored in the first storage device; and
activating the activation target software on the sewing machine when it is determined that the authentication key satisfies the predetermined condition.

2. The software activation system according to claim 1, wherein
the authentication request includes model identification information identifying a model of the sewing machine, and
the computer-readable instructions stored in the memory of the server further cause the processor of the server to perform processes comprising:
identifying the model of the sewing machine on the basis of the model identification information included in the authentication request;

determining, on the basis of the identified model of the sewing machine, whether the sewing machine is a compatible model for the activation target software; and performing notification of a predetermined error to the sewing machine when it is not determined that the sewing machine is the compatible model.

3. The software activation system according to claim 1, wherein the computer-readable instructions stored in the memory of the sewing machine further cause the processor of the sewing machine to perform processes comprising:

transmitting, to a confirmation server included in the at least one server, a confirmation request requesting identification information, the identification information being information for identifying not yet installed software that is at least one of a program and data that is not yet installed;

receiving, from the confirmation server, a confirmation response including the identification information; and installing the not yet installed software in the sewing machine, the confirmation server further includes a second receiver configured to receive the confirmation request from the sewing machine, the computer-readable instructions stored in the memory of the confirmation server further cause the processor of the confirmation server to perform processes comprising:

acquiring the identification information on the basis of the confirmation request when the confirmation request is received by the second receiver; and transmitting, to the sewing machine, the confirmation response including the acquired identification information, and the installing the not yet installed software in the sewing machine includes installing the not yet installed software in the sewing machine on the basis of the identification information included in the received confirmation response.

4. The software activation system according to claim 3, wherein the sewing machine further includes a second storage device configured to store a current status by which software installed in the sewing machine is identifiable, the confirmation request includes the current status stored in the second storage device, the confirmation server further includes a third storage device configured to store a most recent status by which software to be installed in the sewing machine is identifiable, and the acquiring the identification information includes identifying the not yet installed software to be installed in the sewing machine, on the basis of the current status included in the confirmation request and the most recent status stored in the third storage device, and acquiring the identified not yet installed software as the identification information.

5. The software activation system according to claim 3, wherein the sewing machine further includes a second storage device configured to store a current status by which software installed in the sewing machine is identifiable, the confirmation server further includes a third storage device configured to store a most recent status by which software to be installed in the sewing machine is identifiable, the identification information is the most recent status stored in the second storage device, and the installing the not yet installed software includes identifying the not yet installed software to be installed in the sewing machine, on the basis of the most recent status included in the confirmation response and the current status stored in the second storage device, and installing the identified not yet installed software in the sewing machine.

6. The software activation system according to claim 3, wherein the installing the not yet installed software includes generating, from the identification information, a provider source address of the identified not yet installed software, acquiring data of the not yet installed software from the generated provider source address, and installing the data of the not yet installed software in the sewing machine.

7. The software activation system according to claim 3, wherein the confirmation server and the authentication server are a same specific server, and the transmitting of the authentication request to the authentication server and the transmitting of the confirmation request to the confirmation server is a single transmission process to transmit, to the specific server, the authentication request functioning as the confirmation request.

8. The software activation system according to claim 3, wherein the confirmation server and the authentication server are a same specific server, and the transmitting of the confirmation request to the confirmation server includes transmitting the confirmation request to the specific server, when, in the determining whether the authentication key satisfies a predetermined condition, it is determined that the authentication key satisfies the predetermined condition.

9. The software activation system according to claim 3, wherein the sewing machine further includes a display, and the computer-readable instructions stored in the memory of the sewing machine further cause the processor of the sewing machine to perform a process comprising:

displaying, on the display, a guidance screen relating to the not yet installed software, during a period in which processing to install the not yet installed software in the sewing machine is performed by the installing of the not yet installed software on the sewing machine.

10. The software activation system according to claim 1, wherein the sewing machine further includes:

a needle bar on which a sewing needle is mounted;

a needle bar up-and-down movement mechanism configured to move the needle bar up and down; and an operation control device, wherein the operation control device performs control to prohibit performing of the up and down movement of the needle bar by the needle bar up-and-down movement mechanism during a period from when a state is obtained in which the authentication code is acquirable to when the authentication key is received from the authentication server.

11. The software activation system according to claim 1, wherein
the sewing machine further includes an image capture device capable of capturing an image of a predetermined image capture range, and
the acquiring the authentication code is performed on the basis of the image captured by the image capture device.

12. The software activation system according to claim 11, wherein
the sewing machine further includes a bed portion and an arm portion disposed above the bed portion, and
the image capture device is provided in a lower surface of the arm portion.

13. The software activation system according to claim 12, wherein
the sewing machine further includes a movement mechanism configured to be capable of moving an embroidery frame in a direction orthogonal to the up-down direction, above the bed portion and below the arm portion, and
the computer-readable instructions stored in the memory of the sewing machine further cause the processor of the sewing machine to perform a process comprising:
moving the embroidery frame, using the movement mechanism, to a position separated from the image capture range by the image capture device, when causing the image capture device to capture the image.

14. The software activation system according to claim 12, wherein
the sewing machine further includes an auxiliary table detachably mounted on the bed portion, and
the computer-readable instructions stored in the memory of the sewing machine further cause the processor of the sewing machine to perform a process comprising:
performing notification prompting mounting of the auxiliary table on the bed portion when causing the image capture device to capture the image.

15. The software activation system according to claim 11, wherein
the sewing machine further includes lighting configured to be capable of illuminating at least the image capture range, and
the computer-readable instructions stored in the memory of the sewing machine further cause the processor of the sewing machine to perform a process comprising:
causing the lighting to illuminate the image capture range when causing the image capture device to capture the image.

16. The software activation system according to claim 11, wherein
the sewing machine further includes a bed portion, an arm portion disposed above the bed portion, and a projector provided in a lower surface of the arm portion and configured to be capable of projecting an image, and
the computer-readable instructions stored in the memory of the sewing machine further cause the processor of the sewing machine to perform a process comprising:
causing the projector to project a first recommended position image indicating a recommended position in which to place the authentication code in the image capture range, when causing the image capture device to capture the image.

17. The software activation system according to claim 11, wherein
the sewing machine further includes a display, and
the computer-readable instructions stored in the memory of the sewing machine further cause the processor of the sewing machine to perform a process comprising:
when causing the image capture device to capture the image, synthesizing a captured image acquired from the image capture device with a second recommended position image indicating a recommended position in which to place the authentication code in the image capture range, and displaying the synthesized image on the display.

18. A sewing machine capable of being connected to at least one server via a network, the sewing machine comprising:
a first storage device configured to store distinguishing information unique to the sewing machine;
a processor; and
a memory storing computer-readable instructions that, when executed by the processor, cause the processor to perform processes comprising:
acquiring an authentication code corresponding to an activation target software that is at least one of a program and data not activated on the sewing machine;
transmitting, to an authentication server included in the at least one server, an authentication request including the acquired authentication code, the authentication request including individual identification information unique to the sewing machine, the individual identification information being generated on the basis of the distinguishing information acquired from the first storage device;
receiving an authentication key from the authentication server the authentication key having been acquired by the authentication server on the basis of the individual identification information included in the authentication request;
determining whether the received authentication key satisfies a predetermined authentication condition by determining whether the authentication key satisfies the authentication condition on the basis of the distinguishing information stored in the first storage device; and
activating the activation target software on the sewing machine when it is determined that the authentication key satisfies the predetermined authentication condition.

19. A server capable of being connected to a sewing machine via a network, the server comprising:
a receiver configured to receive an authentication request, the authentication request including an authentication code corresponding to not yet installed software that is at least one of a program and data not yet installed in the sewing machine, and a current status by which software installed in the sewing machine is identifiable;
a storage device configured to store a most recent status by which software to be installed in the sewing machine is identifiable;
a processor; and
a memory storing computer-readable instructions that, when executed by the processor, cause the processor to perform processes comprising:
acquiring an authentication key on the basis of the authentication request, when the authentication request is received by the receiver;

transmitting the acquired authentication key to the sewing machine;

when the authentication request is received by the receiver, on the basis of the current status included in the authentication request, and the most recent status stored in the storage device, identifying the not yet installed software to be installed in the sewing machine and acquiring identification information specifying the identified not yet installed software; and transmitting, to the sewing machine, a confirmation response including the acquired identification information.

* * * * *